United States Patent
Makhija et al.

(10) Patent No.: US 12,555,062 B2
(45) Date of Patent: Feb. 17, 2026

(54) DATA PROCESSING FOR EXECUTING TASKS IN ENTERPRISE APPLICATION

(71) Applicant: NB Ventures, Inc., Clark, NJ (US)

(72) Inventors: Subhash Makhija, South Plainfield, NJ (US); Manish Sharma, South Plainfield, IA (US); Abhinit Parelkar, Chicago, IL (US); Mowlali Pinjari, Andhra Pradesh (IN); Ankita Deshpande, Jersey City, NJ (US); Naveen Kumar Gajji, Hyderabad (IN); Ashutosh Chahar, Maharashtra (IN); Aleemuddin Syed, Ranga Reddy District (IN); Kavita Shamrao Borkar, Navi Mumbai (IN)

(73) Assignee: NB Ventures, Inc.

(*) Notice: Subject to any disclaimer, the term of this patent is extended or adjusted under 35 U.S.C. 154(b) by 13 days.

(21) Appl. No.: 18/792,099

(22) Filed: Aug. 1, 2024

(65) Prior Publication Data
US 2024/0420069 A1   Dec. 19, 2024

Related U.S. Application Data

(63) Continuation of application No. 17/514,128, filed on Oct. 29, 2021, now Pat. No. 12,106,257.

(51) Int. Cl.
| G06Q 10/083 | (2024.01) |
| G06F 3/0482 | (2013.01) |
| G06Q 10/0631 | (2023.01) |
| G06Q 10/067 | (2023.01) |
| G06Q 10/087 | (2023.01) |

(52) U.S. Cl.
CPC ..... *G06Q 10/083* (2013.01); *G06Q 10/06316* (2013.01); *G06Q 10/067* (2013.01); *G06Q 10/087* (2013.01); *G06F 3/0482* (2013.01)

(58) Field of Classification Search
CPC .......... G06Q 10/083; G06Q 10/06316; G06Q 10/067; G06Q 10/087; G06F 3/0482; G06F 3/04842
See application file for complete search history.

(56) References Cited

U.S. PATENT DOCUMENTS

| 10,559,043 | B1* | 2/2020 | Schlintl | G06Q 10/06316 |
| 11,080,636 | B1* | 8/2021 | Son | G06Q 10/083 |
| 2018/0018610 | A1* | 1/2018 | Del Balso | G06N 3/09 |
| 2018/0053115 | A1* | 2/2018 | Vachhani | G06Q 30/0204 |
| 2020/0265733 | A1* | 8/2020 | Arfaa | G06Q 10/087 |
| 2021/0264551 | A1* | 8/2021 | Hong | G06Q 10/08 |

* cited by examiner

*Primary Examiner* — A. Hunter Wilder
(74) *Attorney, Agent, or Firm* — David M. Breiner; BrownWinick Law Firm

(57) ABSTRACT

The present invention provides a data processing system and method for operating an enterprise application to execute one or more tasks including a pick-pack-ship task. The invention includes generating a graphical user interface with one or more data points providing one or more item data, one or more lot data for the item data, and one or more handling unit data for the lot data to generate a pick-pack ship projection on the interface based on Artificial intelligence processing of a historical dataset.

20 Claims, 22 Drawing Sheets

DATA PROCESSING FOR EXECUTING TASKS IN ENTERPRISE APPLICATION

CROSS REFERENCE TO RELATED APPLICATIONS

This application is a continuation of U.S. patent application Ser. No. 17/514,128 which was filed with the United States Patent and Trademark Office on Oct. 29, 2021 the entire contents of which is herein incorporated by reference.

BACKGROUND

1. Technical Field

The present invention relates generally to packaging and shipment of items in supply chain enterprise application. More particularly, the invention relates to pick, pack and ship data processing system and method for an enterprise application.

2. Description of the Prior Art

Enterprise applications execute multiple functions depending on the nature of the application. In case of a supply chain enterprise application, the tasks such as Purchase order generation, invoice generation, inventory management, warehouse management, packaging, and shipping of item etc., are executed through the application. Most tasks to be executed are dependent on a graphical user interface (GUI) of the enterprise application (EA).

The Graphical user interfaces (GUIs) provide an effective way to access and explore data. The GUIs may include multiple GUI components for enabling a user to take informed decision based on data patterns and trends. Some GUIs are interactive and responsive to various user inputs. However, most GUI components have limitations of generating data on the interface when dealing with large amount of data being processed at the backend. The problem of availing data for carrying out the tasks and making decisions has been replaced with delivery of accurate, clean and timely information in a structured and sophisticated manner on the GUI. While dealing with packaging and shipment of items in a supply chain application, the information available to a user through the GUI is very limited. On several occasions the kind of information is available on the interface is not understandable to the user unless the user is skilled in the domain. This makes it extremely challenging to provide actionable information to the user. Moreover, processing of structured and unstructured information in enterprise applications that impacts the execution of the tasks are not factored. Recognizing demand of items, conditions related to packaging of specific materials or items, impact of external factors on shipment of packages etc., plays a vital role in enabling a user to make informed decision.

Computing systems and its processing capabilities are used, but the results are inaccurate due the underlining uncertainty about the information being processed. The techniques for automated processes are obsolete, less accurate and time consuming. Further, processing of certain parameters to ensure efficient packaging and shipping are never considered.

In view of the above problems, there is a need for system and method of data processing for packaging and shipping in supply chain that provide visibility and overcome the problems associated with the prior arts.

SUMMARY

According to an embodiment, the present invention provides a data processing method for pick-pack ship operation of an enterprise application (EA). The method includes the step of generating on the application UI, by a processing device, a graphical user interface (GUI) that includes one or more graphical elements depicting one or more data points including one or more item data, one or more lot data for each of the one or more item data, one or more handling unit (HU) data for each of the one or more lot data, and one or more shipping data for each of the one or more handling unit (HU) data wherein the one or more data points generate a pick-pack-ship projection on the GUI through the graphical elements; and one or more input data elements of the one or more graphical elements configured to receive at least one input data associated with the one or more data points in the pick-pack ship operation projection. The method includes the step of receiving the at least one input data through the one or more input data elements of the one or more graphical elements on the GUI for executing a task of the pick-pack-ship operation wherein the at least one input data includes one or more data attributes associated with the one or more data points, generating the one or more data attributes of the one or more data points on the interface wherein the one or more data attributes are modified depending on the task of the pick-pack-ship operation to be executed, and processing the at least one input data, the one or more modified data attributes of the one or more data points by the processor coupled to an AI engine based on at least one data model trained on the historical dataset for projection of one or more stages in execution of the pick-pack ship operation on the GUI.

In an embodiment, the present invention provides a pick-pack ship data processing system comprising at least one processor and a memory storing instructions that allow the at least one processor to execute the data processing method.

In an embodiment, the data processing method and system of the invention includes a first data point of the one or more data points connected to a second data point of the one or more data points on the interface by one or more connector elements of the one or more graphical element to generate the pick-pack ship projection through the one or more graphical elements based on processing of the historical dataset by the processor coupled to the Artificial intelligence (AI) engine.

In an embodiment, the at least one data model is generated based on data enrichment of the historical dataset. The method of data enrichment includes the steps of receiving the historical dataset, cleansing the received dataset to obtain a normalized dataset, filtering the normalized dataset, dividing the normalized dataset into training dataset and testing dataset, generating the at least one data model based on the training dataset and the testing dataset, generating a prediction dataset for the testing dataset using the training data set through the at least one data model, providing the prediction dataset as input to a neural network and testing data as output to identify one or more data attribute weights for determining accuracy of the prediction dataset, and in response to determination of accuracy to be above a threshold value, storing the dataset in a historical database.

In a related embodiment, the neural network is configured to identify the one or more data attribute weights assigned to at least one prediction data model and process the identified weights to determine at least one optimum data attribute weight for the prediction data model wherein a demand of the one or more items or an optimum shipping data is predicted based on the optimized prediction data models associated with the historical data set.

In an embodiment, the at least one data model is trained on the historical dataset by extracting a plurality of categories from the normalized dataset for creating taxonomy, extracting a plurality of distinct words from the normalized dataset to create a list of variables, transforming the normalized dataset into a training data matrix using the list of variables, and creating a training data model from the classification code vectors and the training data matrix by using the machine learning engine (MLE) and the AI engine for training the at least one data model.

In an embodiment, the one or more lot data is predicted by cleansing the received at least one data object, filtering the cleansed data object, classifying the filtered data object to a set of existing clusters by a supervised machine learning based data classifier wherein the data classifier is applied to one or more cluster centers obtained from an unsupervised machine learning algorithm, and generating a sample input based on the classified data object to predict the one or more lot data to be depicted on the GUI.

In an embodiment the present invention provides a data processing system for operating an enterprise application. The system includes at least one processor, and a memory storing instructions that allow the at least one processor to receive at least one input data through one or more input data elements of one or more graphical elements on a graphical user interface (GUI) for executing at least one task wherein the one or more input data elements are associated with one or more data points of the GUI, in response to receiving the at least one input data, identify a relationship between the input data and the one or more data points based on one or more data attributes associated with the input data and the one or more data points, generate the one or more data attributes of the one or more data points on the interface based on the identified relationship, wherein the one or more graphical elements of the GUI enable a user to modify the data attributes depending on the task to be executed, and generating on the GUI, a projection of one or more stages in execution of the task through the one or more graphical elements.

In an advantageous aspect, the present invention utilizes Machine Learning algorithms, prediction data models and embedded data analytics. Further, the User interface with specific data points provides actionable information to the user for enabling automated execution of Pick-pack-ship action.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figures 1, 2:
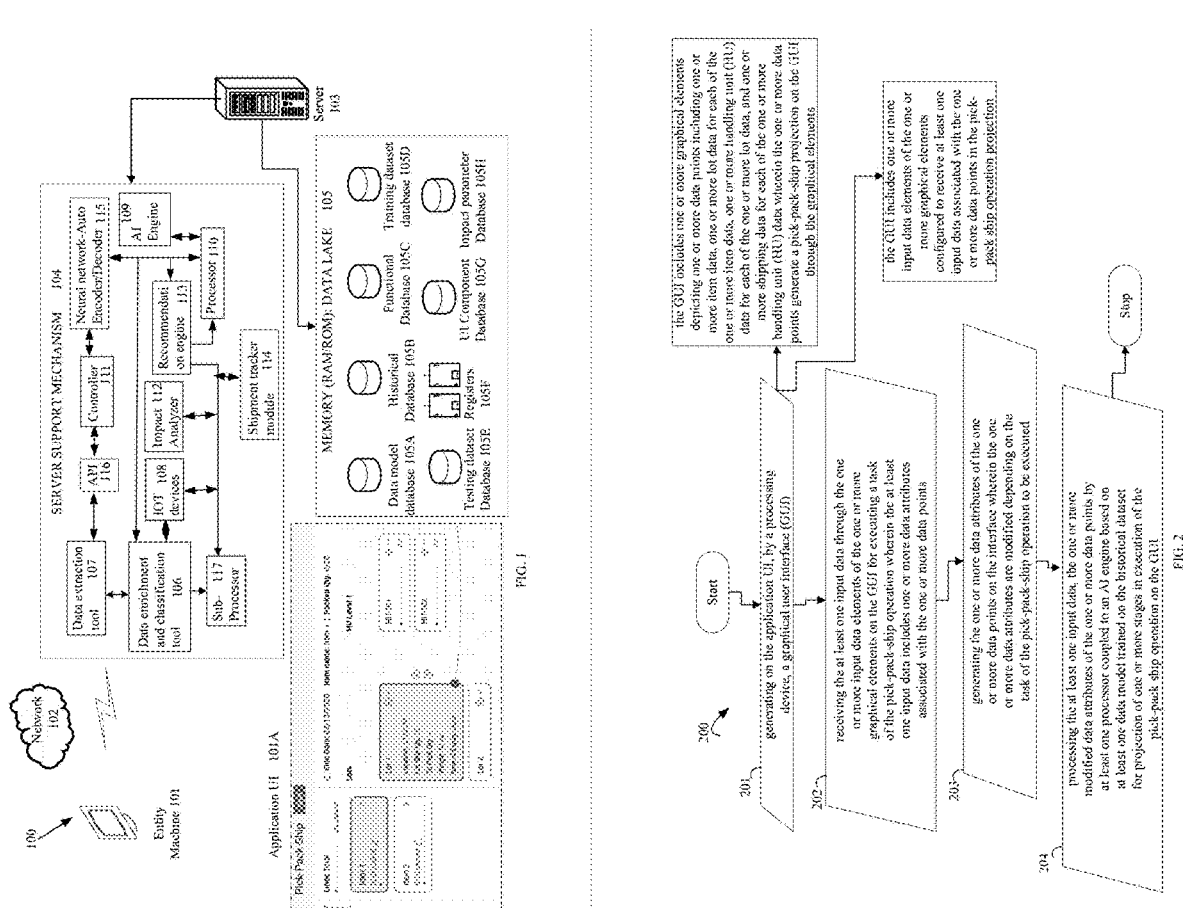
FIG. 1 is a pick-pack ship data processing system in accordance with an embodiment of the invention.
FIG. 2 is a flowchart depicting a pick-pack ship data processing method in accordance with an embodiment of the invention.

Described herein are the various embodiments of the present invention, which includes pick-pack-ship data processing method and system for an enterprise application.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "graphical element," "data points," or "data attributes," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a pick-pack-ship data processing system and method for an enterprise application.

Referring to FIG. 1, a data processing system 100 for pick-pack-ship operation of an enterprise application is provided in accordance with an embodiment of the present invention. The system 100 includes at least one entity machine 101 with a Graphical user interface 101A for sending, receiving, modifying, auto populating, displaying or triggering processing of one or more data over a network 102 to generate one or more data points on the interface 101A. The system 100 includes a server 103 configured to receive data and instructions from the machine 101 or AI based backend triggers associated with execution of one or more function of the enterprise application. For eg:, a contract describing the timelines for delivering one or more items to a particular entity is triggered by the enterprise application. Based on the trigger, the application auto-populates data on the graphical user interface 101A showing the related data points and recommended packaging configuration along with recommended shipping configuration for the packed items. The system 100 includes a support mechanism/architecture 104 for performing pick-pack ship data processing with multiple functions including historical data extraction, classification and structuring of data attributes for analysis of data, creation of one or more data models configured to process different parameters including impact data, historical dataset etc. The system 100 includes a data store/data lake 105 for accessing object such as item related data including item packaging related data, item shipment related data and storing a plurality of training data models created by support mechanism 105.

In an embodiment the server 103 of the invention may include various sub-servers for communicating and processing data across the network. The sub-servers include but are not limited to content management server, application server, directory server, database server, mobile information server and real-time communication server.

In an embodiment the entity machine 101 may communicate with the server 103 wirelessly through communication interface, which may include digital signal processing circuitry. Also, the entity machine 101 may be implemented in a number of different forms, for example, as a smart-phone, computer, personal digital assistant, or other similar devices.

In an exemplary embodiment, the Graphical user interface (GUI) 101A of the entity machine 101 enables cognitive computing to improve interaction between user and an enterprise or supply chain application(s). The interface 101A improves the ability of a user to use the computer machine itself. Since, the interface 101A provides actionable insights into various data points including but not limited to item data, lot data, handling unit data, shipment data, etc., at the same instant on the single screen of the GUI, the interface thereby enables a user to take informed decision or undertake an appropriate strategy for executing pick-pack and shipping tasks thereby managing inventory and other supply chain functions. By eliminating multiple layers, processing tasks and recordation of information to get a desired data point on the GUI 101A, which would be slow, complex and impractical to assess, particularly to a user without deep knowledge of the subject, the user interface 101A is more user friendly and improves the functioning of the existing computer systems.

In an exemplary embodiment, the GUI of the data processing system enables execution of one or more task in an enterprise application. The tasks may include a pick-pack-ship operation, an inventory management operation, warehouse management operation or any similar operation of an enterprise application having one or more interdependent sub-tasks requiring identification of relationships between data points associated with the sub-tasks for generating the GUI thereby enabling a user to execute the task through the GUI based on actionable data provided on the interface. The data processing system includes the at least one processor and memory storing instruction that allow the processor to receive at least one input data through one or more input data elements of one or more graphical elements on a graphical user interface (GUI) for executing at least one task wherein the one or more input data elements are associated with two or more data points displayed on the GUI, in response to receiving the at least one input data, identify a relationship between a first data point of the two or more data points and a second data point of the two or more data points based on one or more data attributes associated with the first data point and the second data point, generate the one or more data attributes of the two or more data points on the interface based on the identified relationship, wherein the one or more graphical elements of the GUI enable a user to modify the data attributes depending on the task to be executed; and connect the first data point and the second data point on the interface by one or more connector elements of the one or more graphical element to generate a projection of one or more stages in execution of the task.

The relationship between the first data point and the second data point is identified by processing of a historical dataset by a processor coupled to an AI engine wherein the at least one input data is processed based on at least one data model trained on the historical dataset to identify the relationship and generate the one or more data attributes as the one or more data points on the GUI.

In an example embodiment, the relationship between a item data point and a handling unit (HU) data point is identified by processing of historical dataset related to historical item data and historical handling unit data. The attributes including but not limited to weight of handling unit, quantity of item, dimension of item and handling unit etc., are generated on the interface depending on the number and type of item to be packaged for shipping.

In an embodiment, the one or graphical element includes one or more data containers or data cards depicting the one or more data points on the GUI wherein the data cards are configured to remain in expanded state and collapsed state depending on the stage of the execution thereby providing the projection of the task on a single screen of the interface.

In another embodiment, the one or more graphical element includes one or more progress indicators related to the one or more data points and informing a user about state of progress made in one or more sub-tasks to be executed. For eg., in case of handling unit (HU) data as the data point, a net weight of the handling unit is shown as a progress indicator that alerts a user about the maximum capacity the handling unit has reached for packing items inside the HU. Similarly, a progress indicator for a line item informs the user about the amount completed packing for a particular line/item.

In another embodiment, the data cards of one data point include data attributes of another data point. For eg: expanding a HU data card shows information about HU and lots packed inside the HU as organized in its category with a label HU and items/lots. Further, selection of a single card displays information about the HU/lot and the whole journey of where that card originated from, which lots and previous HUs if applicable includes in it and where it goes next until the end of the task to project the stages on the single interface screen. Further, connectors indicate transition from a dotted line connector to a solid line while fading other graphical elements on the GUI to indicate packed items inside the HU.

In an example embodiment, the support mechanism/architecture 104 of the system 100 includes a control interface for accessing pick-pack-ship related information received at the server 103. The support architecture 104 includes a data extraction tool 106, a data enrichment and classification tool 107, one or more Internet of things (IOT) devices 108, an AI engine 109, at least one processor 110, a controller 111, an impact analyzer 112, a recommendation engine 113, shipment tracker module 114, neural network 115, an API 116, and one or more sub processors 117.

In an embodiment, the support mechanism 104 performs various prediction through AI engine and mitigation processes with multiple functions including historical dataset extraction, classification of historical datasets, artificial intelligence-based processing of new datasets and structuring of data attributes for analysis of data, creation of one or more data models configured to process different parameters, structuring of workflows etc. The AI engine is a tool that enables structuring of artificially intelligent data processing system and reiterate automated tasks for execution of one or more function in an EA.

The support mechanism 104 includes data integration to access a plurality of external data sources, typically from distributed storage like Data Lake, provides data cleaning and enrichment through the data enrichment tool and classification tool 107. The mechanism 104 further provides distribution components that assign groups of items to one or more dedicated learning algorithms. Each learner has a feature transformation (forming features based on say a hierarchy) flow as well as pre and post processing logic associated with it. The feature transformation turns data into sparse matrices and provides customized as well as standard transformations (crossing, binning, normalization, etc.) along the way. The learner invocation consists of a training and a prediction phase, where the former phase uses statistics-based time series models and additive model-based libraries, and the latter applies sampling methods. The outputs of all learners are then consolidated into a single set of sample paths by ensemble methods. The data extraction tool 108 enables extraction of text from non-text files like image files or pdf files.

The impact analyzer 112 of the support architecture 104, analysis the impact of one or more parameters including weather, politics, newsfeed etc., on the pick-pack-ship application. For eg:, in case the newsfeed informs about curfew in certain parts of a region, the shipment of an item will be impacted. The processor 110 coupled to the AI engine 109 processes the information to derive intent of the news and the probable impact on one or more functions of the enterprise application including shipping. Due to the curfew on the route of delivery, the shipment may not reach the desired destination on expected date and hence the AI engine enables real time adjustment to one or more data points related to shipment data on the GUI to provide an accurate estimation of the adjusted delivery time based on re-routing of the item shipping route. Similarly, the weather dataset is also available as input dataset to the system 100. Impact data such as historical weather data and weather forecast for next few days from current date is fetched from the data lake 105. The system 100B includes Data pipelines that fetches data from the data lake 105, cleans the data and weather dataset and imputes data with a code writer. The system pipeline also reads the Weather data (History and Forecast) from existing weather data and prepares the holidays list for required date range. The cleansed and imputed dataset and holidays datasets are then fed to one or more hierarchical timeseries data model. The data models run and computes forecasts, error metrics persisting in the data lake in specified conformed zones/location. The system populates the respective SQL database tables from the data models to compute forecast and metrics. The database table is being used by the graphical user interface 101A.

The support mechanism 104 may include hardware components or software components or a combination of hardware and software components integrating multiple data objects through one or more applications implemented on a cloud integration platform.

In an embodiment, the software component as a bot may be a computer program enabling an application to integrate with distinct data source devices and systems by utilizing Artificial intelligence. The hardware includes the memory, the processor, control unit and other associated chipsets especially dedicated for performing recalibration of data models to carry out data extraction and other associated functions for data objects in the EA when triggered by the bots. The memory may include instruction that are executable by the processor for causing the processor to execute the method of pick pack ship through the EA.

The support mechanism 104 further includes the controller 111 encoded with instructions, enabling the controller 111 to function as a bot for pick-pack-ship operations. The support mechanism 104 includes the AI engine 109 configured for enabling generation of one or more data models for processing of historical data set related to item data, lot data, handling unit data and shipping data to predict data points to be generated on the GUI interface 101A. The AI engine 109 analyzes processing results of the one or more data models associated with the historical dataset to generate a prediction data model. The AI engine 109 is configured to transform the historical dataset into a data matrix for training the one or more data models on the historical dataset. The mechanism 104 includes pick-pack-ship data cleansing, categorization and classification for processing variables and optimization parameters. The mechanism 104 includes the processor 110 configured for performing various functions including but not limited to selecting appropriate data models, generating a normalized dataset from the received historical dataset where a bot creates a data script based on the received data for generating one or more normalized dataset by utilizing a library of functions, etc. The mechanism includes the data extraction tool 107 configured for extracting and mapping data to category by a clustering script generated through the AI engine 109. Further, the recommendation engine 113 of the mechanism 104, processes historical data with the AI engine 111 and machine learning techniques to recommend one or more data points for selection on the GUI 101A. The recommendation engine 113 is a data filtering tool configured for using Machine learning and AI to recommend actions or relevant items on the GUI. While, in FIG. 1 the recommendation engine is shown with single implementation, it shall be apparent to a person skilled in the art that the system 100 may include one or more recommendation engines configured to recommend lot selection, handling unit selection and shipping selection, based on one or more recommendation data models.

The shipping tracking module 114 of the support mechanism tracks the items shipped until delivery. The mechanism 104 includes an API 116 for triggering the one or more data models through the processor 110 for carrying out the pick-pack-ship operation. Since pick-pack-ship functions include multiple sub-functions within the operation like data cleansing and enrichment, object/item categorization etc., the support mechanism 104 includes sub-processors 117 for carrying out multiple tasks simultaneously. Further, the pick-pack-ship operation leads to inventory management. The mechanism 104 includes the neural network as an auto encoder/decoder 115 coupled to the controller 111 and configured for identifying one or more data attribute weights assigned to the prediction data model and processing the identified weights to determine an optimum data attribute weight for the prediction data model. The one or more data points generated on the GUI is predicted based on the optimized prediction data model associated with the historical dataset.

In example embodiment the server 103 shall include electronic circuitry for enabling execution of various steps by the processor. The electronic circuit has various elements including but not limited to a plurality of arithmetic logic units (ALU) and floating-point Units (FPU's). The ALU enables processing of binary integers to assist in formation of at least one table of data attributes where the data models implemented for predicting one or more data points on the GUI are applied to the data table for obtaining forecasting data and recommending packaging and shipping data. In an example embodiment the server electronic circuitry includes at least one Athematic logic unit (ALU), floating point units (FPU), other processors, memory, storage devices, high-speed interfaces connected through buses for connecting to memory and high-speed expansion ports, and a low-speed interface connecting to low-speed bus and storage device. Each of the components of the electronic circuitry, are interconnected using various busses, and may be mounted on a common motherboard or in other manners as appropriate. The processor 110 can process instructions for execution within the server 103, including instructions stored in the memory or on the storage devices to display graphical information for the GUI on an external input/output device, such as display coupled to high-speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

In an example embodiment, the system of the present invention includes a front-end web server communicatively coupled to at least one database server, where the front-end web server is configured to process the input data related to item, lot, HU or shipping based on one or more data models by receiving from an ensemble of the one or more data models, a recommended parameter associated with the one or more data points processed by the server and applying an AI based dynamic processing logic to the recommended parameter to automate task of pick-pack and shipping.

The processor 110 may be implemented as a chipset of chips that include separate and multiple analog and digital processors. The processor 110 may provide coordination of the other components, such as controlling user interfaces, applications run by devices, and wireless communication by devices.

The Processor 110 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user/data source/IOT device and convert them for submission to the processor. In addition, an external interface may be provided in communication with processor 110, so as to enable near area communication of device with other devices. External interface may provide, for example, for wired communication in some implementations, or for wireless communication in other implementations, and multiple interfaces may also be used.

In an embodiment, the present invention uses GPUs (Graphical processing units) for enabling AI to provide computing power to processes humongous amount of data.

In an exemplary embodiment, the Artificial intelligence engine 109 employs machine learning techniques that learn patterns and generate insights from the data. Further, the AI engine 109 with ML employs deep learning that utilizes artificial neural networks for analyzing data to determine associations and provide meaning to unidentified data.

In another embodiment, the invention enables integration of Application Programming Interfaces (APIs) 116 for plugging aspects of AI into the pick-pack-shipping application.

Referring to FIG. 1, the various elements like the support mechanism 104 and the data lake/memory data store 105 are shown as external connections to the server 103 in accordance with an embodiment of the invention. However, it shall be apparent to a person skilled in the art that these elements may be part to an integrated server system. Also, some of the sub-elements of the support mechanism 104 and the data lake/memory data store 105 either alone or in various combinations may be part of a server system as other external connections.

In an example embodiment, the data lake/memory data store 105 includes plurality of databases as shown in FIG. 1. The data store 105 includes a data model database 105A storing one or more data models for predicting item data, lot data, handling unit data, and shipping data, a historical database 105B storing historical datasets from one or more entities related to pick-pack-shipping of items, a functional database 105C configured for storing a library of functions enabling generation of actionable data points from the historical dataset, a training dataset database 105D and a testing dataset database 105E for storing training data and testing data obtained at different levels of the historical data set. The data model database 105A includes one or more training data models, one or more prediction data models, one or more packaging data model, and one or more shipment data model. The historical database 105A includes one or more historical databases including but not limited to historical item database, historical handling unit database, historical shipping database, and a data script database configured for storing a plurality of data script generated by the AI engine 109 based on analysis of the historical dataset. The data script is generated based on prediction analysis, and deep learning performed on historical data in historical database 105A. The data lake/store 105 further includes a plurality of registers 105F as part of the memory data store 105 for temporarily storing data from various databases to enable transfer of data by a processor between the databases as per the instructions of the AI engine 109. The data store 105 includes UI component database 105G for storing one or more UI components like the graphical elements to be generated on the GUI. The data lake 105 includes an impact parameter database 105H configured for storing impact parameters such as weather, other external variables, promotional data, etc., utilized for recommending data point selection on the GUI.

In an embodiment, the one or more data models to process the historical dataset for determining prediction dataset is determined based on data points including engagement and pricing models, analysis of historical policies and strategies, consumption patterns, behaviour and performance data, opportunities for consolidation of volumes across geographies, business units, product and service categories, volume tier discounts, new technologies, substitute products, low cost alternatives, standardization or reuse opportunities, currency hedging for materials which are predominantly imported, and inventory management practices.

The memory data store 105 may be a volatile, a non-volatile memory or memory may also be another form of computer-readable medium, such as a magnetic or optical disk.

The memory store 105 may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment, the system is provided in a cloud or cloud-based computing environment. The pick-pack-ship data processing system enables more secured process considering the issues inherent with cloud environments.

In an exemplary embodiment, the pick-pack-ship system 100 of the present invention is configured for analyzing impact of a plurality of varying parameters (changes in pricing, weather etc.,) on supply chain operation execution including picking, packaging and shipping of items. The varying parameters include market dynamics and internal drivers across object parts, products, commodities, and business units/plants across various Regions.

In an embodiment, the system 100 of the present invention includes a pick-pack ship network having one or more application nodes configured to provide the one or more data points in real time to the at least one processor for enabling the system to execute one or more pick-pack ship operations through the enterprise application GUI.

Referring to FIG. 2, a flowchart 200 depicting a pick-pack-ship data processing method is provided in accordance with an embodiment of the present invention. The method includes the steps of 201 generating on the application UI, by a processing device, generating on the application UI, by a processing device, a graphical user interface (GUI) that includes one or more graphical elements depicting one or more data points including one or more item data, one or more lot data for each of the one or more item data, one or more handling unit (HU) data for each of the one or more lot data, and one or more shipping data for each of the one or more handling unit (HU) data wherein the one or more data points generate a pick-pack-ship projection on the GUI through the graphical elements; and one or more input data elements of the one or more graphical elements configured to receive at least one input data associated with the one or more data points in the pick-pack ship operation projection. In step 202, receiving the at least one input data through the one or more input data elements of the one or more graphical elements on the GUI for executing a task of the pick-pack-ship operation wherein the at least one input data includes one or more data attributes associated with the one or more data points. In step 203 generating the one or more data attributes of the one or more data points on the interface wherein the one or more data attributes are modified depending on the task of the pick-pack-ship operation to be executed, and in step 204, processing the at least one input data, the one or more modified data attributes of the one or more data points by at least one processor coupled to an AI engine based on at least one data model trained on the historical dataset for projection of one or more stages in execution of the pick-pack ship operation on the GUI.

In a related embodiment, the at least one data model is a data model from an ensemble of data models including graphical data model, document data model and relationship data model. The at least one data model is generated by the processor based on data enrichment of the historical dataset. The method of data enrichment includes the steps of receiving the historical dataset, cleansing the received dataset to obtain a normalized dataset, filtering the normalized dataset, dividing the normalized dataset into training dataset and testing dataset, generating the at least one data model based on the training dataset and the testing dataset, generating a prediction dataset for the testing dataset using the training data set through the at least one data model, providing the prediction dataset as input to a neural network and testing data as output to identify one or more data attribute weights for determining accuracy of the prediction dataset, and in response to determination of accuracy to be above a threshold value, storing the dataset in a historical database.

In an embodiment, the neural network enables determination of data optimum attribute weights for the at least one data model as a prediction data model. The system of the invention provides a variety of schemes for distributed learning of forecasting models.

In an embodiment, the invention retrieves prediction dataset based on a plurality of factors including revenue details, logistics, lead times, market fragmentation, capacity constraints, currency fluctuations and political risks.

In another related embodiment, the at least one data model is trained on the historical dataset by extracting a plurality of categories from the normalized dataset for creating taxonomy, extracting a plurality of distinct words from the normalized dataset to create a list of variables, transforming the normalized dataset into a training data matrix using the list of variables, and creating a training data model from the classification code vectors and the training data matrix by using the machine learning engine (MLE) and the AI engine for training the at least one data model.

In yet another related embodiment, the one or more lot data as the one or more data points is predicted by cleansing the received at least one data object, filtering the cleansed data object, classifying the filtered data object to a set of existing clusters by a supervised machine learning based data classifier wherein the data classifier is applied to one or more cluster centers obtained from an unsupervised machine learning algorithm, and predicting the one or more lot data to be depicted on the GUI based on the classified data object.

In an embodiment, the one or more item data includes characteristic data of one or more items and the one or more lot data includes location data, weight data, date of expiry, and quantity.

In an embodiment, the one or more handling unit (HU) data includes HU type, gross weight, gross volume, dimensions of package at handling unit, and packaged content. Also, the one or more shipping data includes shipment type, address, location coordinates, status, shipment vehicle characteristics, and shipment tracking data objects.

In an embodiment, the data processing method includes receiving the at least one input data from one or more data sources including an IOT device, an image capturing device, QR code scanner, barcode, one or more application functional objects, a user and a historical entity database. The input data is a text data, an image data, a voice data, or a combination thereof.

In an embodiment, wherein the image data is processed by a data extraction tool to extract text data from the image data before sending it to the input data element on the GUI. The data extraction tool processes the image data by extracting one or more data by drawing a box around the data based on a region of interest data script and cropping the data for extraction, sending the extracted one or more data to an optical character recognition module for converting the extracted data to a text data element, and processing the converted text data elements by the processor coupled to the AI engine based on the data model to fetch one or more lot data from the historical database.

In an embodiment, the one or more handling unit (HU) data is obtained after embedded analysis of a historical item packaging dataset and a historical item shipment dataset to generate at least one packaging data model and at least one shipment data model. The embedded analysis of the historical item packaging dataset includes grouping, sequencing, orientation and loading to determine the one or more handling unit (HU) data. Further, at least one handling unit cost model is obtained after processing of historical commodity index data, the historical item packaging dataset and the historical item shipment dataset wherein the at least one handling unit cost model enables prediction of handling unit (HU) cost.

In an embodiment, the data processing method of the invention includes predicting demand of one or more item based on an optimized item prediction data model associated with a historical hierarchal item data set and predicting an optimum shipment data based on an optimized item shipment prediction data model associated with the historical item shipment dataset.

In a related embodiment, the data processing includes one or more constraints impacting the demand prediction and optimum shipment data prediction for the one or more items wherein the constraints include impact parameters such as weather, holiday information, performance of the objects, pandemics and political decisions.

In another related embodiment, the data processing method includes computing forecasts for the one or more items at different levels in the historical hierarchical item dataset and historical item shipment dataset based on a hierarchical time series library with a fixed set of exogenous and hyper parameters wherein the exogeneous parameters are the constraints and the hyper parameters are parameters such as seasonality configured to finetune the item prediction data model and the item shipment prediction data model.

In an embodiment, a plurality of backend data scripts is created by a bot based on a historical item data pattern and a historical item shipment pattern of the one or more items and AI based processing logic to predict the demand of the one or more items and the optimum shipment data.

In an embodiment, the AI based processing logic integrates deep learning, predictive analysis, information extraction, planning, scheduling, impact analysis and robotics for analysis of the historical item data patterns and historical item shipment data patterns to predict the demand and optimum item shipment data.

In an example embodiment, the pick pack ship process includes order receiving, order picking, order packing and order shipping operations. The order is received from an entity through the enterprise application and a warehouse generated an assigned shipment notice. Then a warehouse worker takes the packing slip and picks the items for the order from the warehouse shelves. Supplier's Inventory storage strategy and their Pick-and-Pack methods are key drivers for Supplier Shipping cost in addition to the actual material cost. These parameters determine the efficiency of the process. Different methods may work best for different entities, depending on sales volume. The order reaches a packing station where it is packed securely, sealed and labeled for shipping. The orders are sorted by carrier on the loading dock, and they are ready for pickup and delivery through the carriers at the end of the day. Since, the method for efficient pick-pack and shipping is complex, automation of tasks and generation of data on the GUI is extremely challenges and error prone. The GUI of the present invention not only generates accurate data with Artificial intelligence (AI) based processing of historical dataset related to pick-pack-ship application, but also provides actionable data points on a single GUI screen, thereby enabling faster processing of pick-pack-ship as very less or virtually no flipping of GUI screens is required to execute the entire operation.

In an exemplary embodiment, the data processing system of the present invention provides a system feedback and progress indicators to inform user on the interface about the lots that are available for the item they're about to pick and the HUs that are available for association, including the space that is available inside HU for packing. The historical datasets are processed by the processor coupled to the AI engine for enabling the recommendation engine to recommend selection of one or more data points on the interface for auto populating the data on the GUI.

In an example embodiment, the pick-pack-ship data processing system is triggered based on one or more supply chain management (SCM) scenarios including but not limited to PO (Purchase order) generation, detection of shortage in Inventory warehouse based on items reaching below a threshold limit, demand and supply forecasting for given items with prediction of increased requirements etc. The processor coupled to the AI engine processes one or more SCM scenarios and the pick-pack-ship data processing system is triggered by these scenarios for execution through the GUI.

Figure 3:
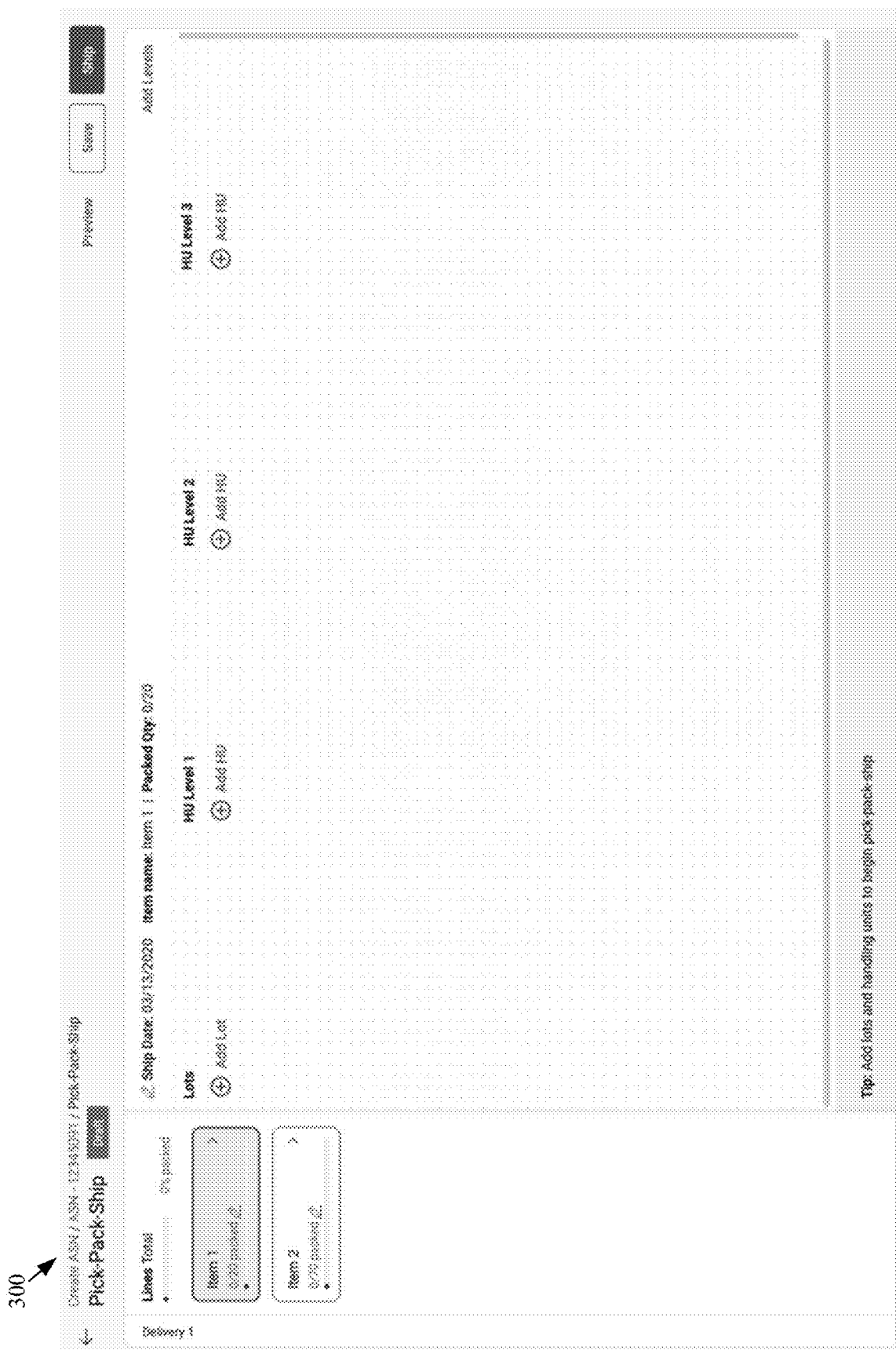
FIG. 3 is a graphical user interface (GUI) showing graphical elements related to addition of lots and handling units to initiate pick-pack-ship process in accordance with an embodiment of the invention.

Referring to FIG. 3, a graphical user interface (GUI) 300 showing graphical elements related to addition of lots and handling units to initiate pick-pack-ship process is shown in accordance with an embodiment of the invention. The GUI enables addition of lots related to one or more items and also enables addition of handling units for storing the items as part of the pick-pack-ship process. The data points are implemented with cards/containers providing details about the lot data, item data, HU data and shipping data. Further the one or more data points are linked through a connecter showing the navigation or connection path between the item and the HU. The User interface with specific data points providing actionable information to the user for enabling automated execution of Pick-pack-ship action is extremely advantageous.

Figure 3A:
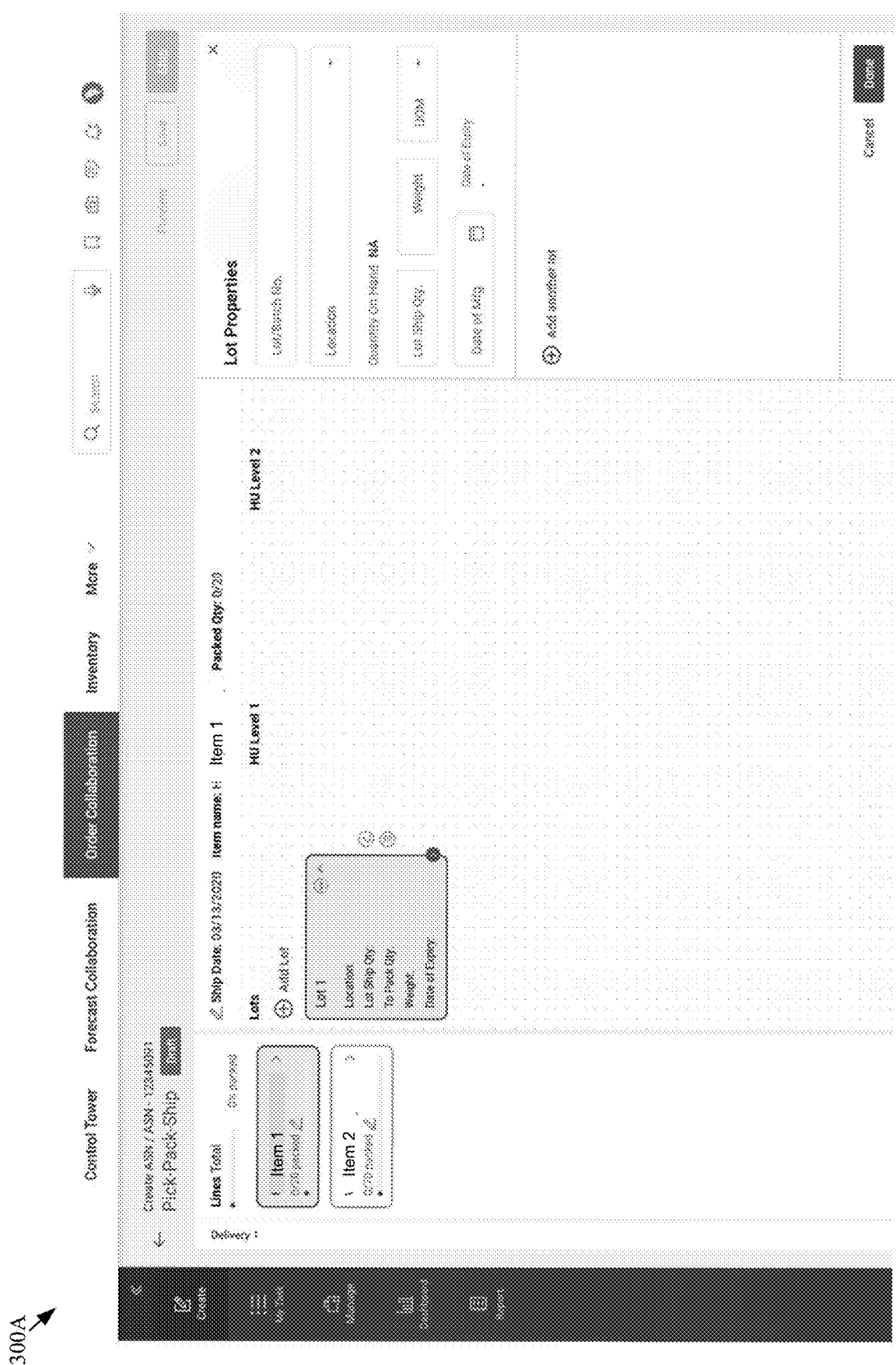
FIG. 3A is a graphical user interface (GUI) showing graphical elements related to addition of lot for lot-controlled line items in accordance with an embodiment of the invention.

Referring to FIG. 3A, a graphical user interface (GUI) 300A showing graphical elements related to addition of lot for lot-controlled line items is shown in accordance with an embodiment of the invention.

Figure 3B:
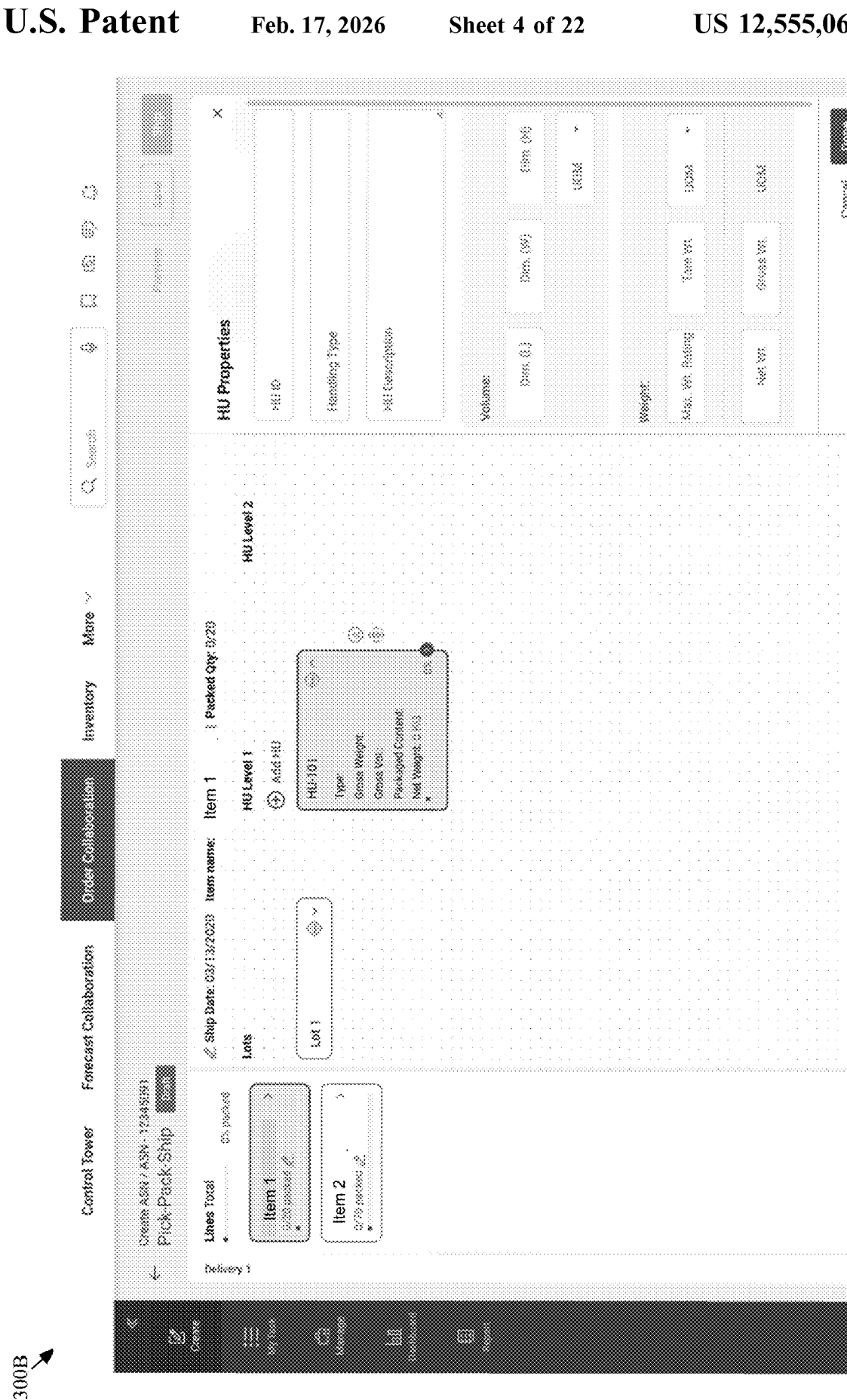
FIG. 3B is a graphical user interface (GUI) showing graphical elements related to addition of handling unit (HU) with one or more HU characteristics in accordance with an embodiment of the invention.

Referring to FIG. 3B, a graphical user interface (GUI) 300B showing graphical elements related to addition of handling unit (HU) with one or more HU characteristics is shown in accordance with an embodiment of the invention. The handling unit characteristics like type, description, volume weight etc., can be auto populated by a bot based on processing of the historical dataset.

Figure 4:
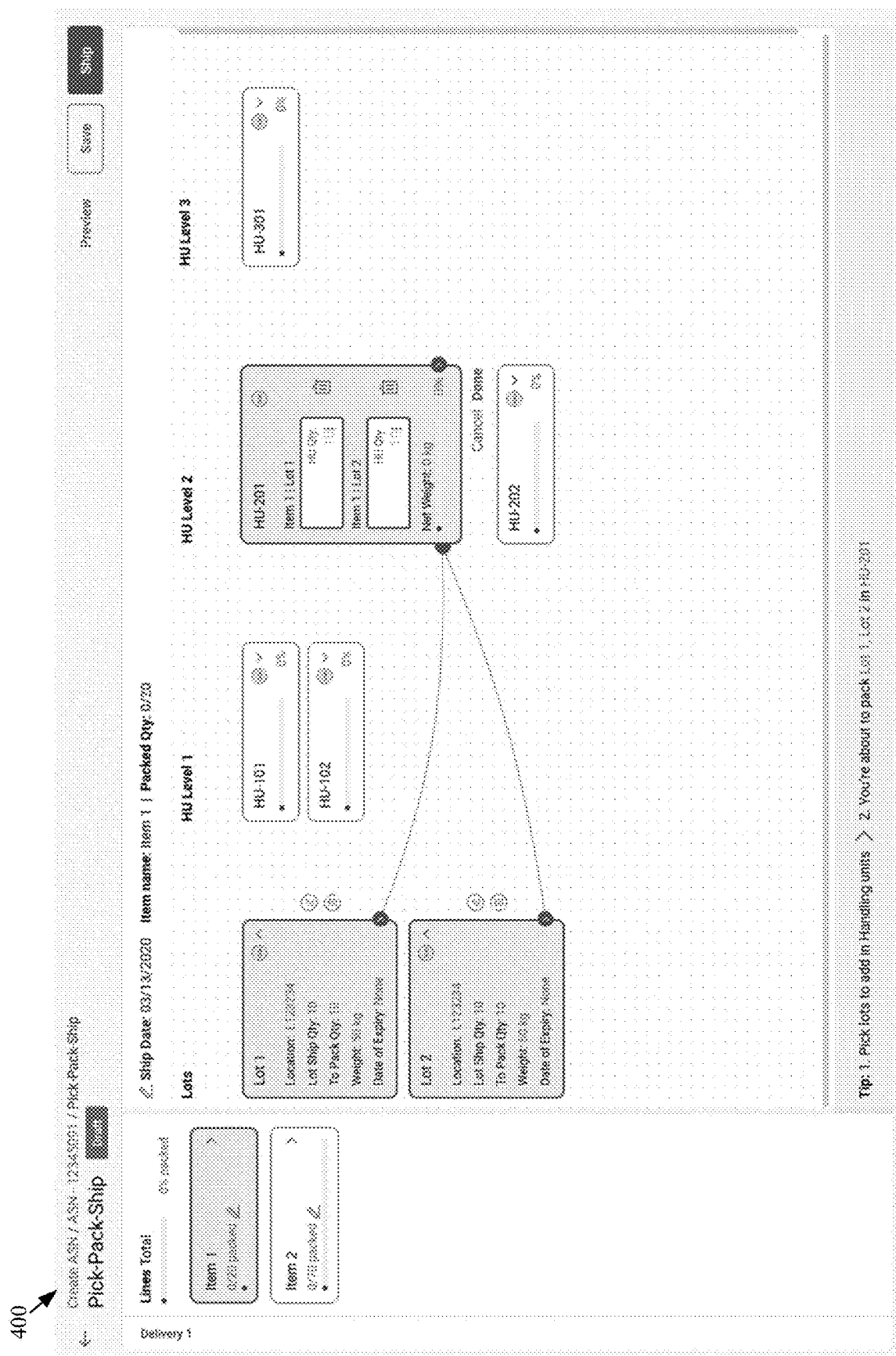
FIG. 4 is a graphical user interface (GUI) showing graphical elements related to addition of one or more lots to a handling unit (HU) in accordance with an example embodiment of the invention.

FIG. 4 is a graphical user interface (GUI) 400 showing graphical elements related to addition of one or more lots to a handling unit (HU) in accordance with an example embodiment of the invention. As shown, lot 1 and lot 2 are packages in handling unit 201. Once a user selects a data card related to the data point, a connector graphical element as a dotted line is generated on the GUI and it moves along with a curser pointer to assign a selected data point to another data point on the screen. For eg., the connector enables assigning a lot data card to a HU data card where the lot needs to be packed. Advantageously, with minimum clicks, one data point is assigned to another data point on the interface. Further, selection of a data card expands and reveals its options else it remains in collapsed state to save screens real time state. The cards collapse after association once the user begins associating other lots and HU process.

Figure 4A:
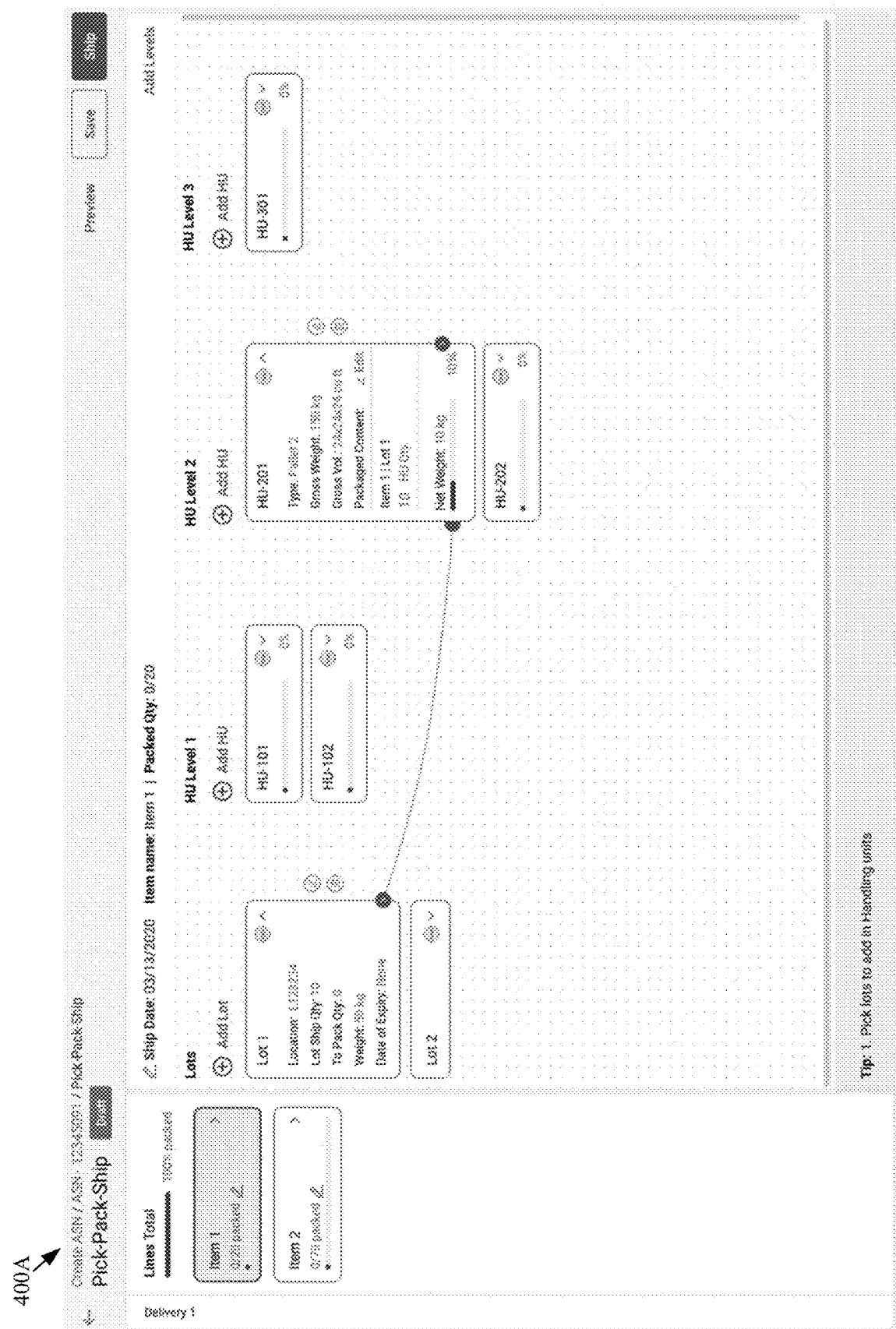
FIG. 4A is a graphical user interface (GUI) showing graphical elements related to packaged content inside a handling unit (HU) in accordance with an embodiment of the invention.

FIG. 4A is a graphical user interface (GUI) 400A showing graphical elements related to packaged content inside a handling unit (HU) in accordance with an embodiment of the invention. The handling unit graphical element provides all details of the HU and the lots inside the HU.

Figure 5:
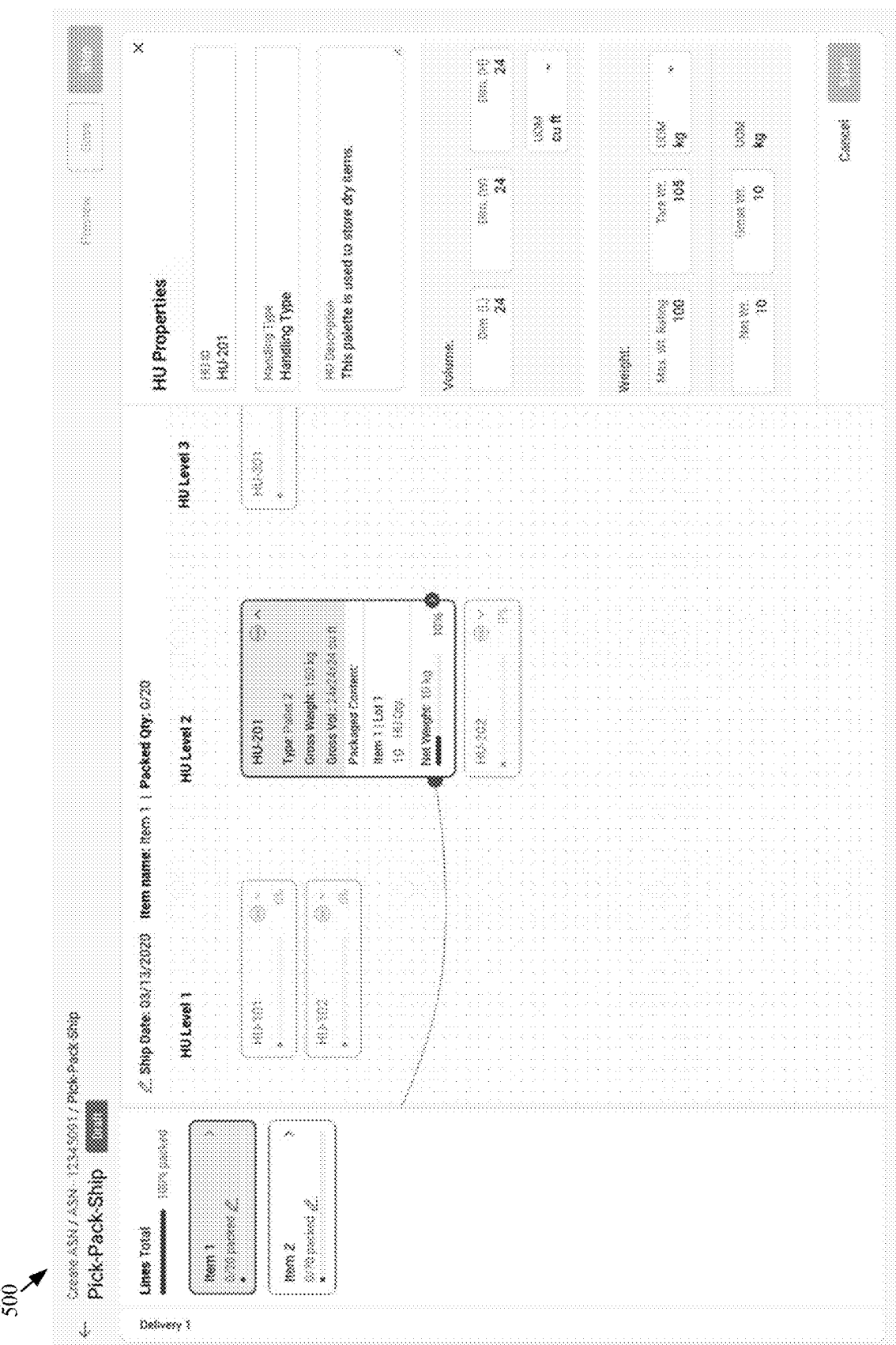
FIG. 5 is a graphical user interface (GUI) showing graphical elements related to editing of HU properties in accordance with an example embodiment of the invention.

FIG. 5 is a graphical user interface (GUI) 500 showing graphical elements related to editing of HU properties in accordance with an example embodiment of the invention. The HU properties including HU description, volume, weight etc. are edited on the GUI depending on the item to be packaged and the shipping route for the item. The data is auto populated on the interface based on historical dataset processing by the processor coupled to the AI engine.

Figure 5A:
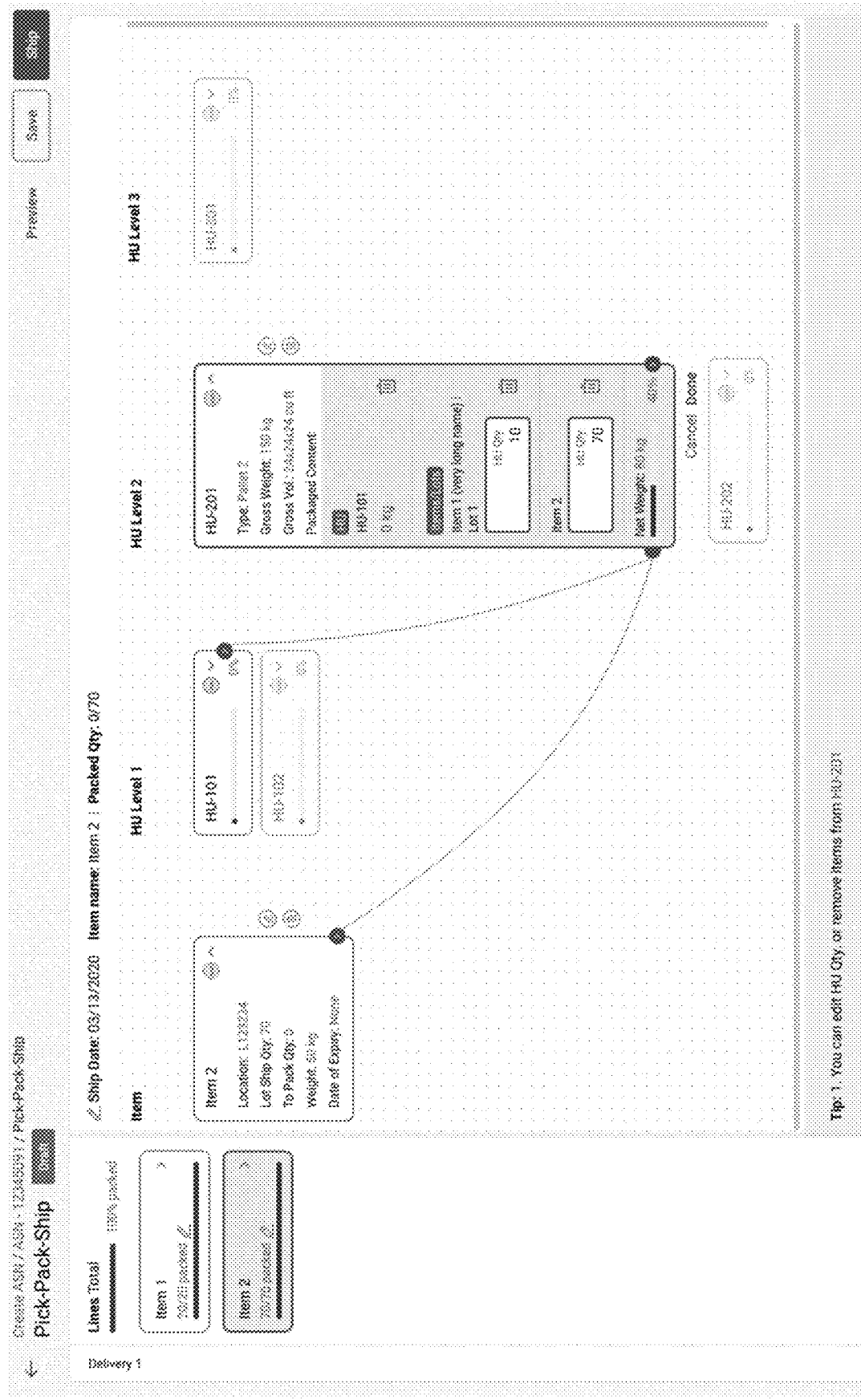
FIG. 5A is a graphical user interface (GUI) showing graphical elements related to editing of HU quantity or removal of items from HU for packaging in accordance with an example embodiment of the invention.

FIG. 5A is a graphical user interface (GUI) 500A showing graphical elements related to editing of HU quantity or removal of items from HU for packaging in accordance with an example embodiment of the invention.

Figure 6:
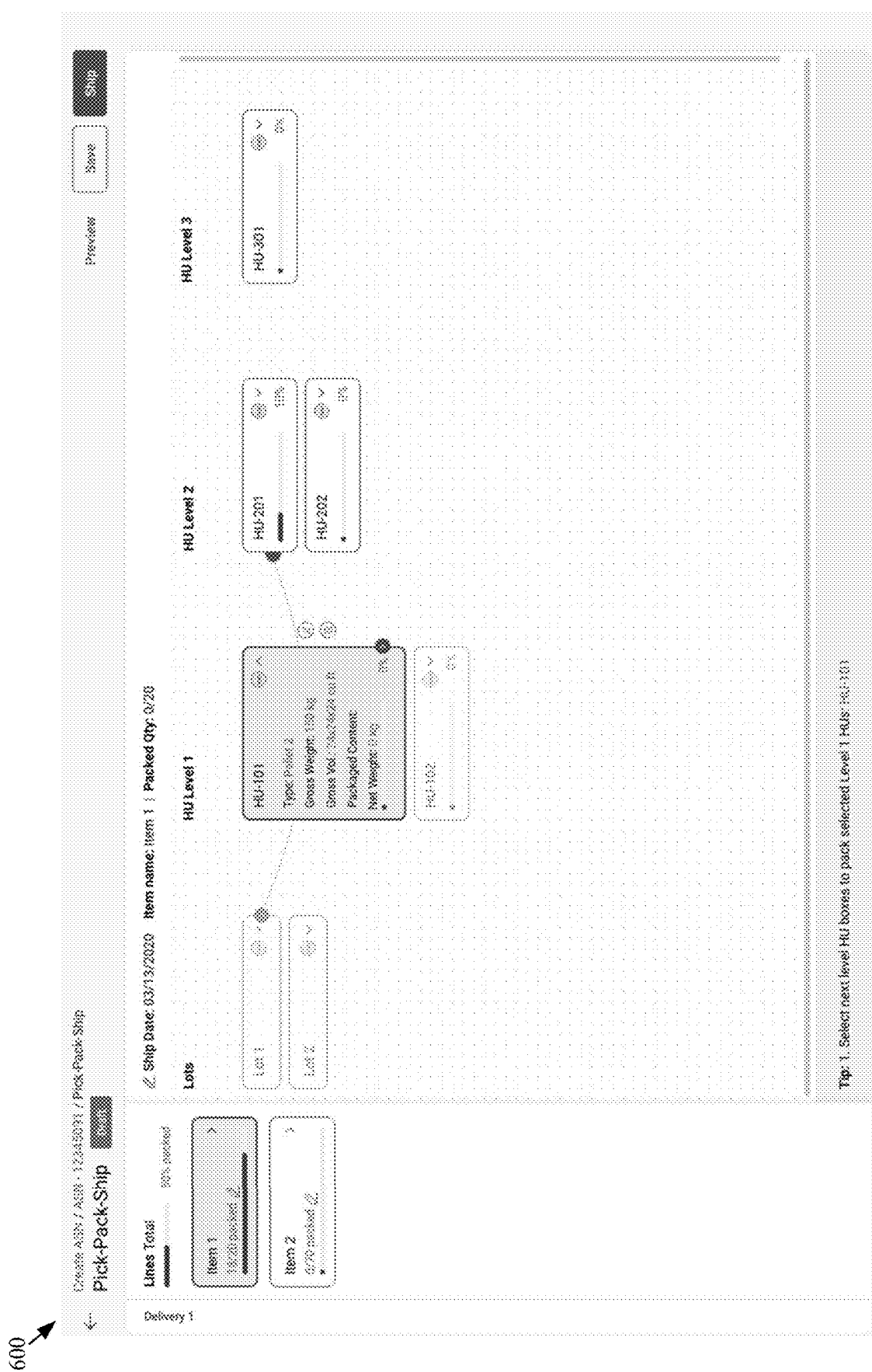
FIG. 6 is graphical user interface (GUI) showing graphical elements related to selection of one or more HU for packaging the selected HU inside another HU in accordance with an example embodiment of the invention.

FIG. 6 is graphical user interface (GUI) 600 showing graphical elements related to selection of one or more HU for packaging the selected HU inside another HU in accordance with an example embodiment of the invention. There are multi-level HU's available on the single GUI showing all relevant actionable data to the user.

Figure 6A:
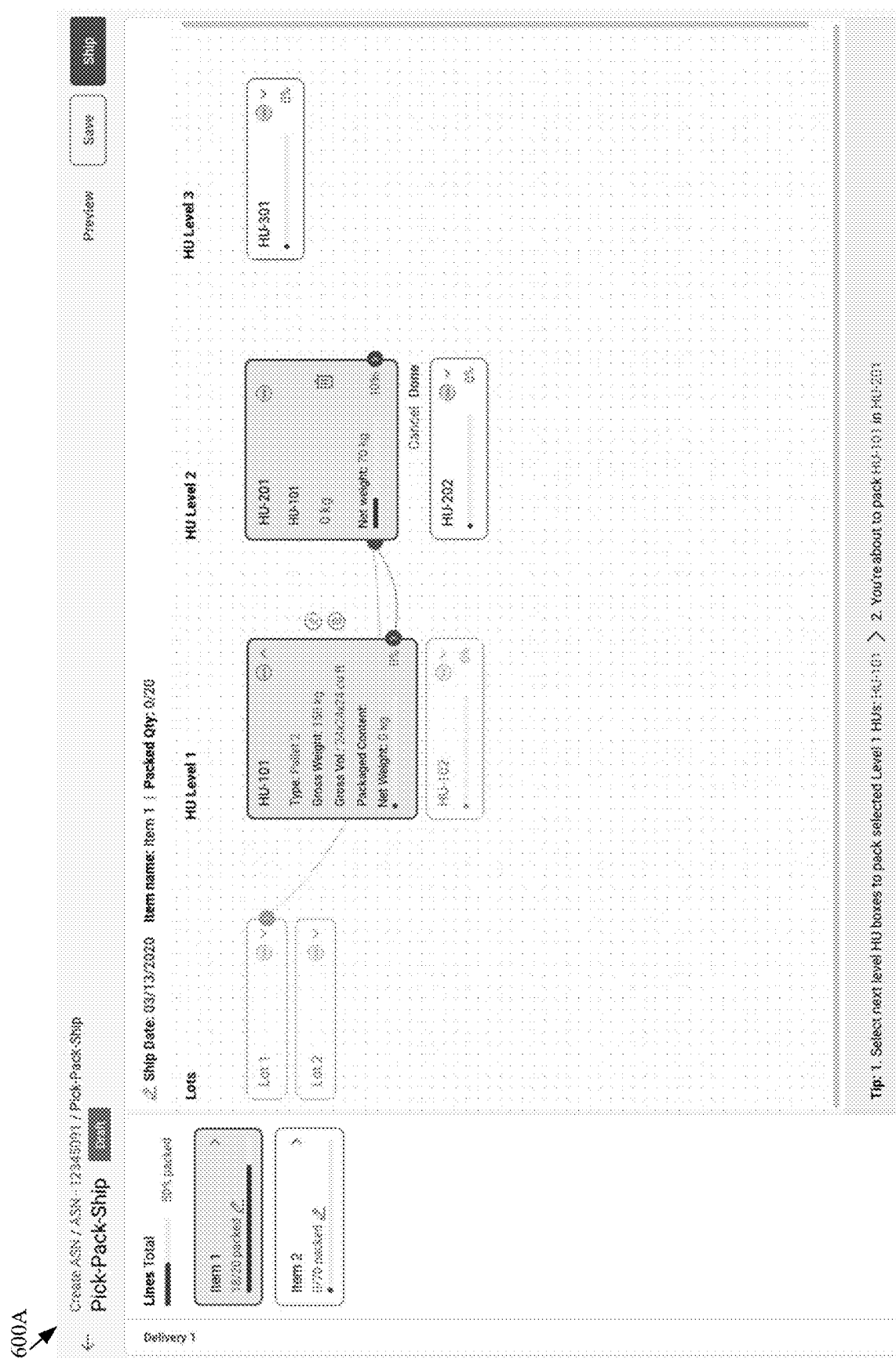
FIG. 6A is a graphical user interface (GUI) showing graphical elements related to packaging of one or more HU inside another HU in accordance with an example embodiment of the invention.

FIG. 6A is a graphical user interface (GUI) 600A showing graphical elements related to packaging of one or more HU inside another HU in accordance with an example embodiment of the invention.

Figure 6B:
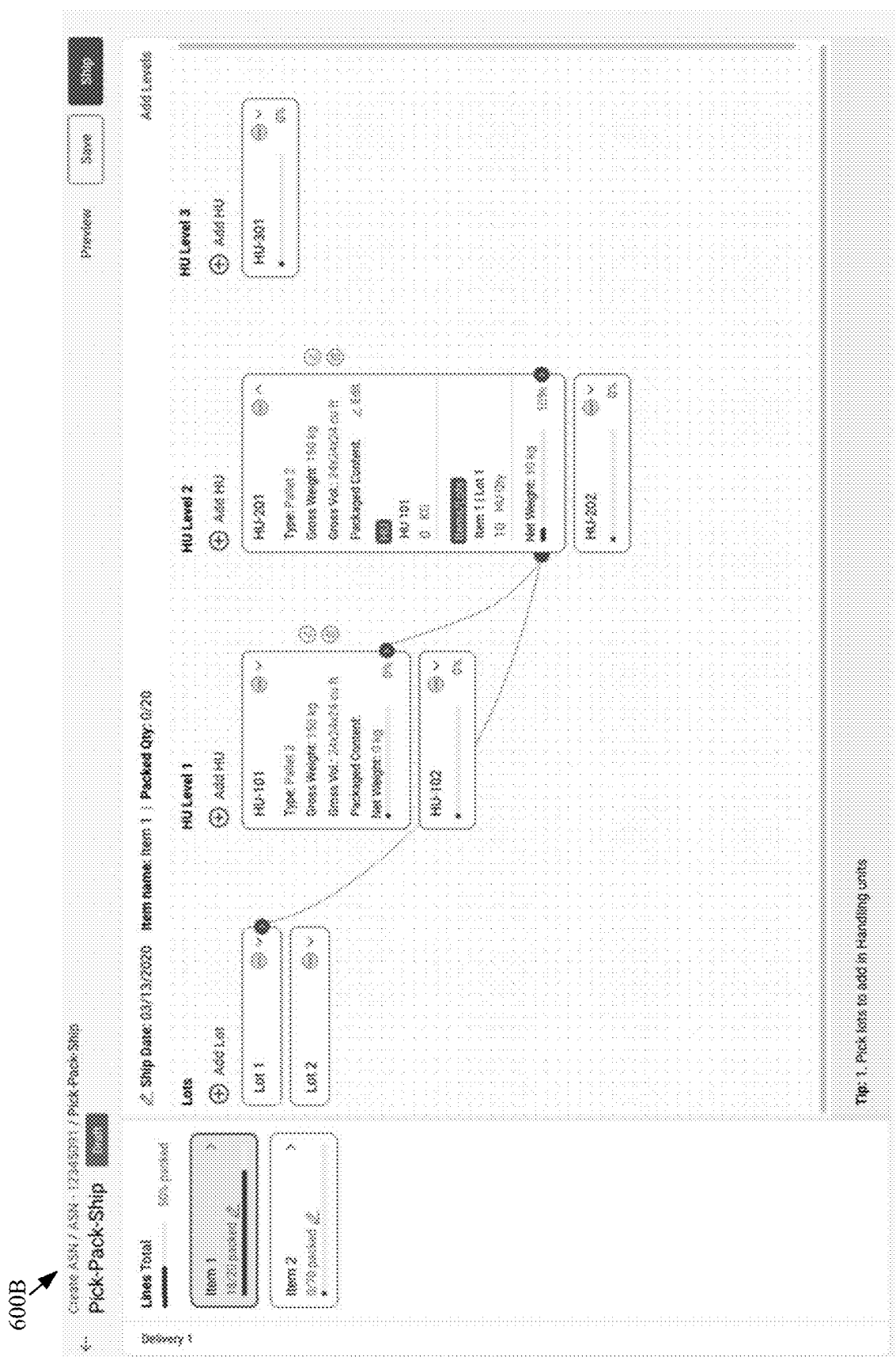
FIG. 6B is a graphical user interface (GUI) showing graphical elements related to finalized packaging of one or more HU inside another HU in accordance with an example embodiment of the invention.

FIG. 6B is a graphical user interface (GUI) 600B showing graphical elements related to finalized packaging of one or more HU inside another HU in accordance with an example embodiment of the invention. The interface includes one or more actionable buttons including edit, expansion or minimization of cards/container, done button for confirming packaging etc.

Figure 7:
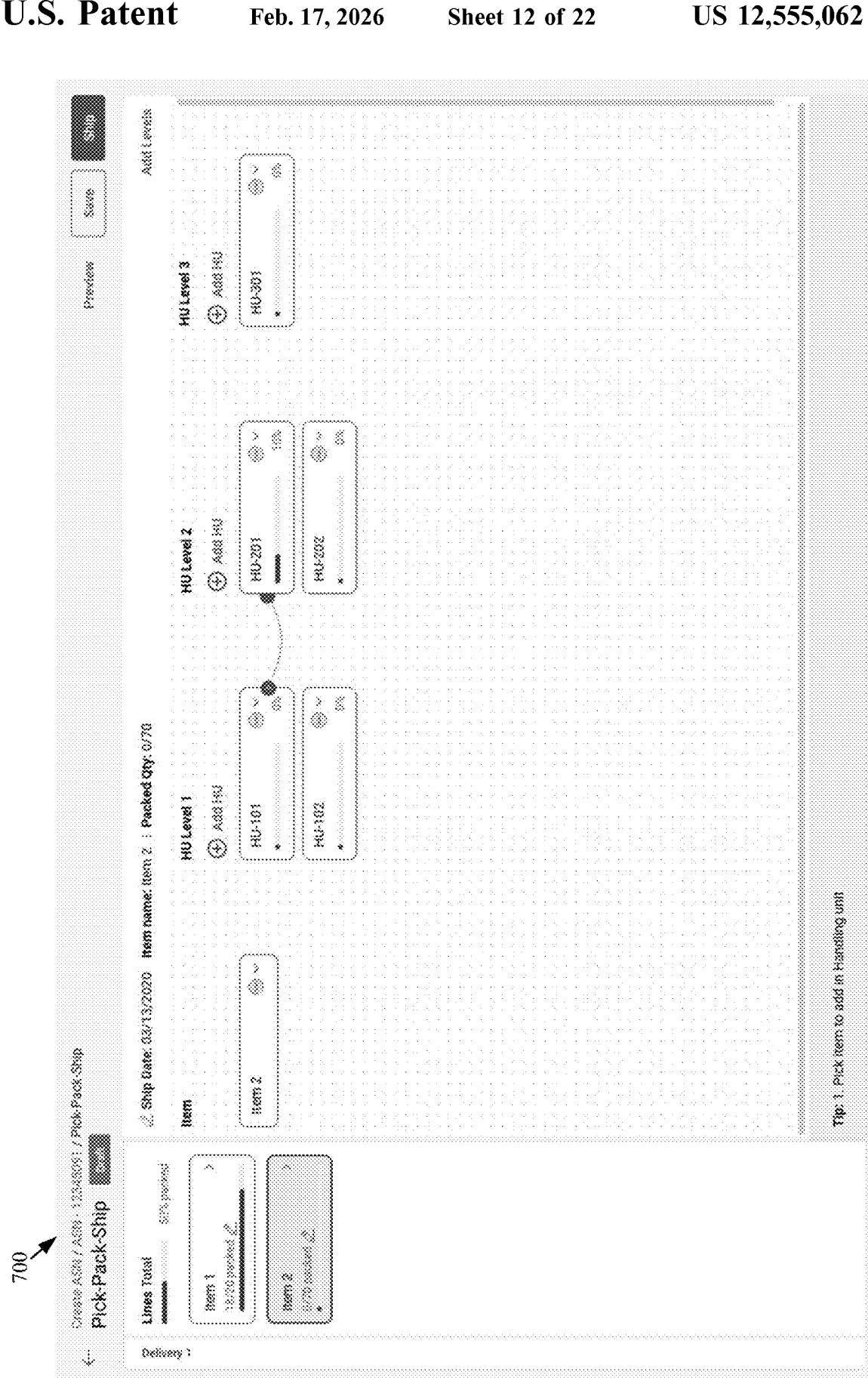
FIG. 7 is a graphical user interface (GUI) showing graphical elements related to selection of an item for packing and picking in accordance with an example embodiment of the invention.

FIG. 7 is a graphical user interface (GUI) 700 showing graphical elements related to selection of an item for packing and picking in accordance with an example embodiment of the invention.

Figure 7A:
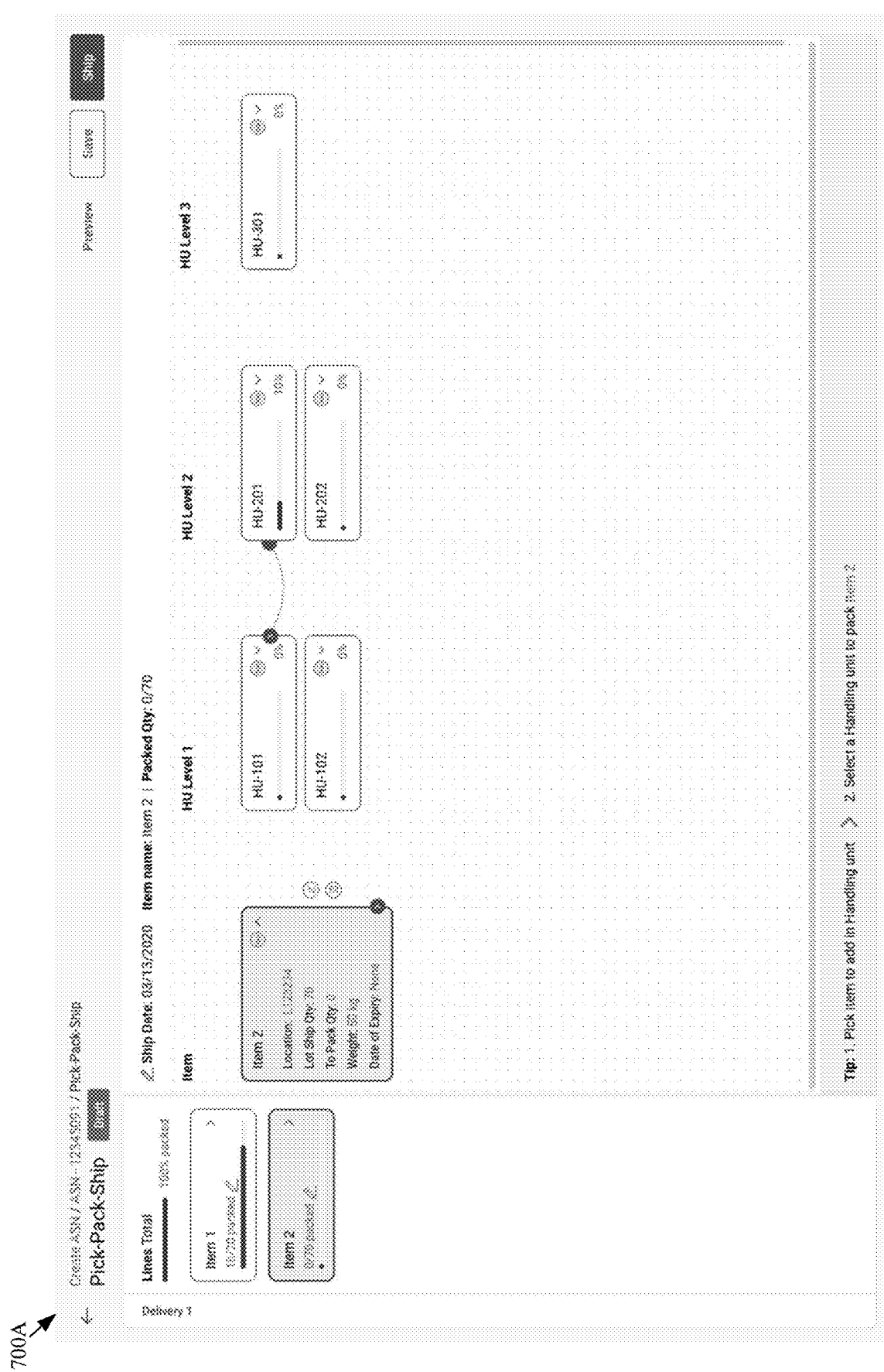
FIG. 7A a graphical user interface (GUI) showing graphical elements related to selection of non-lot-controlled item inside a HU at any level in accordance with an example embodiment of the invention.

FIG. 7A a graphical user interface (GUI) 700A showing graphical elements related to selection of non-lot-controlled item inside a HU at any level in accordance with an example embodiment of the invention.

Figure 7B:
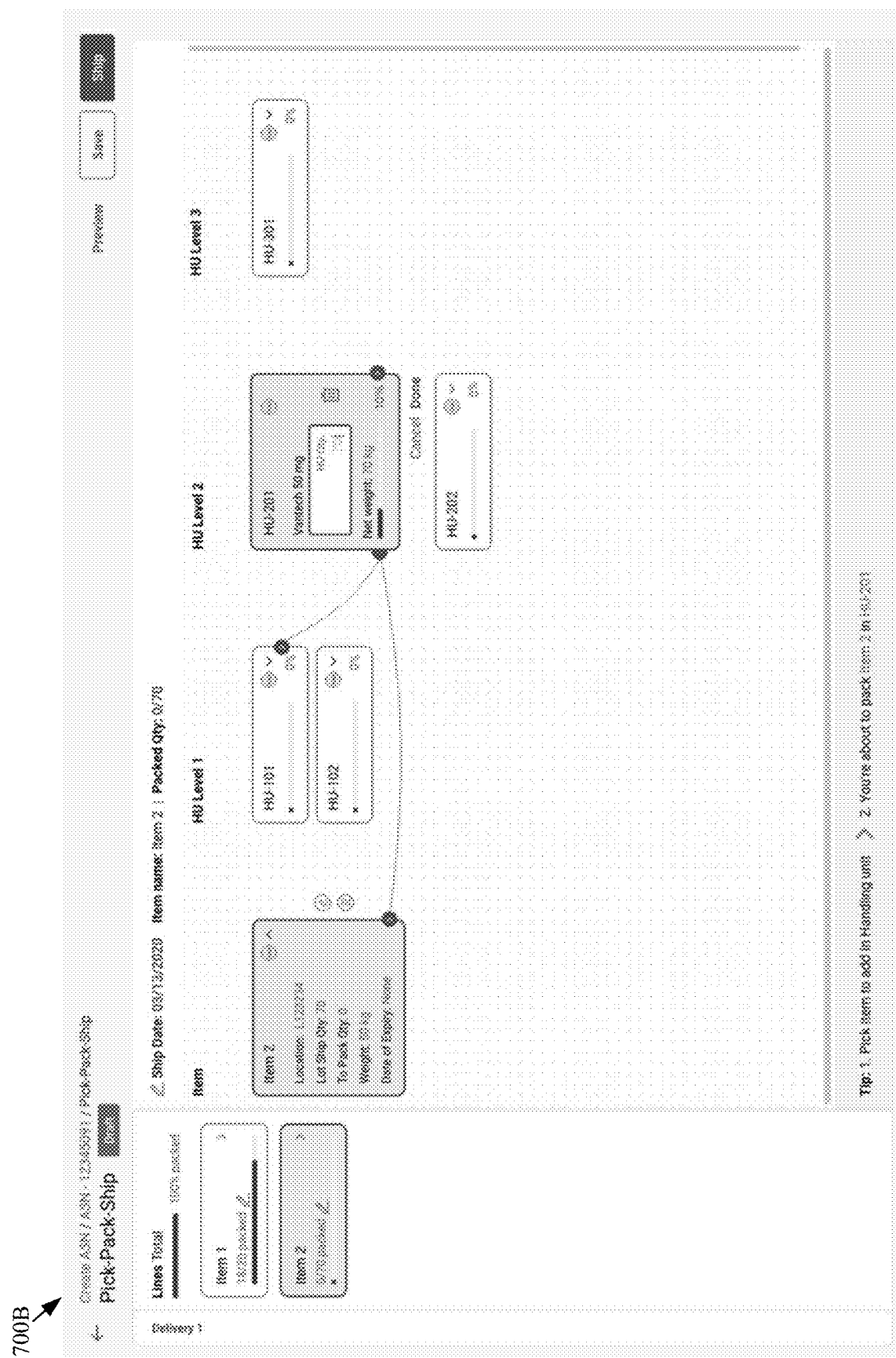
FIG. 7B is a graphical user interface (GUI) showing graphical elements related to editing of HU with item quantity details in accordance with an example embodiment of the invention.

FIG. 7B is a graphical user interface (GUI) 700B showing graphical elements related to editing of HU with item quantity details in accordance with an example embodiment of the invention.

Figure 7C:
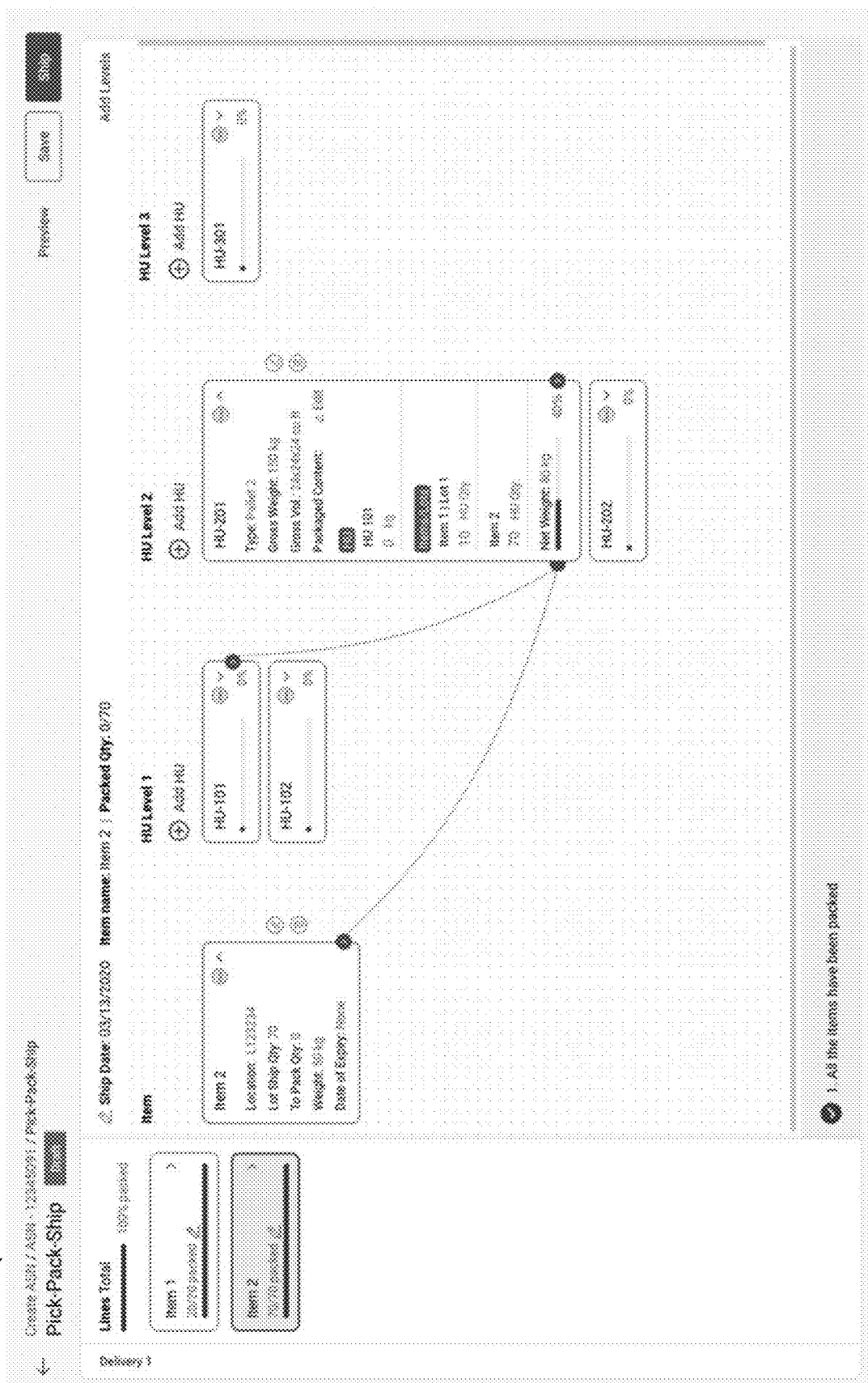
FIG. 7C is a graphical user interface (GUI) showing graphical elements related to finalized packaging of one or more Item inside a HU in accordance with an example embodiment of the invention.

FIG. 7C is a graphical user interface (GUI) 700C showing graphical elements related to finalized packaging of one or more Item inside a HU in accordance with an example embodiment of the invention. The user interface includes a contextual tip card/strip or panel functionality at the bottom of the GUI enabling a user to interact with the GUI in an informed manner by providing guidance to the user as to what they can do with the selection of lots or handling units. It provides a check mark indicator once all the line items have been packed.

Figure 8:
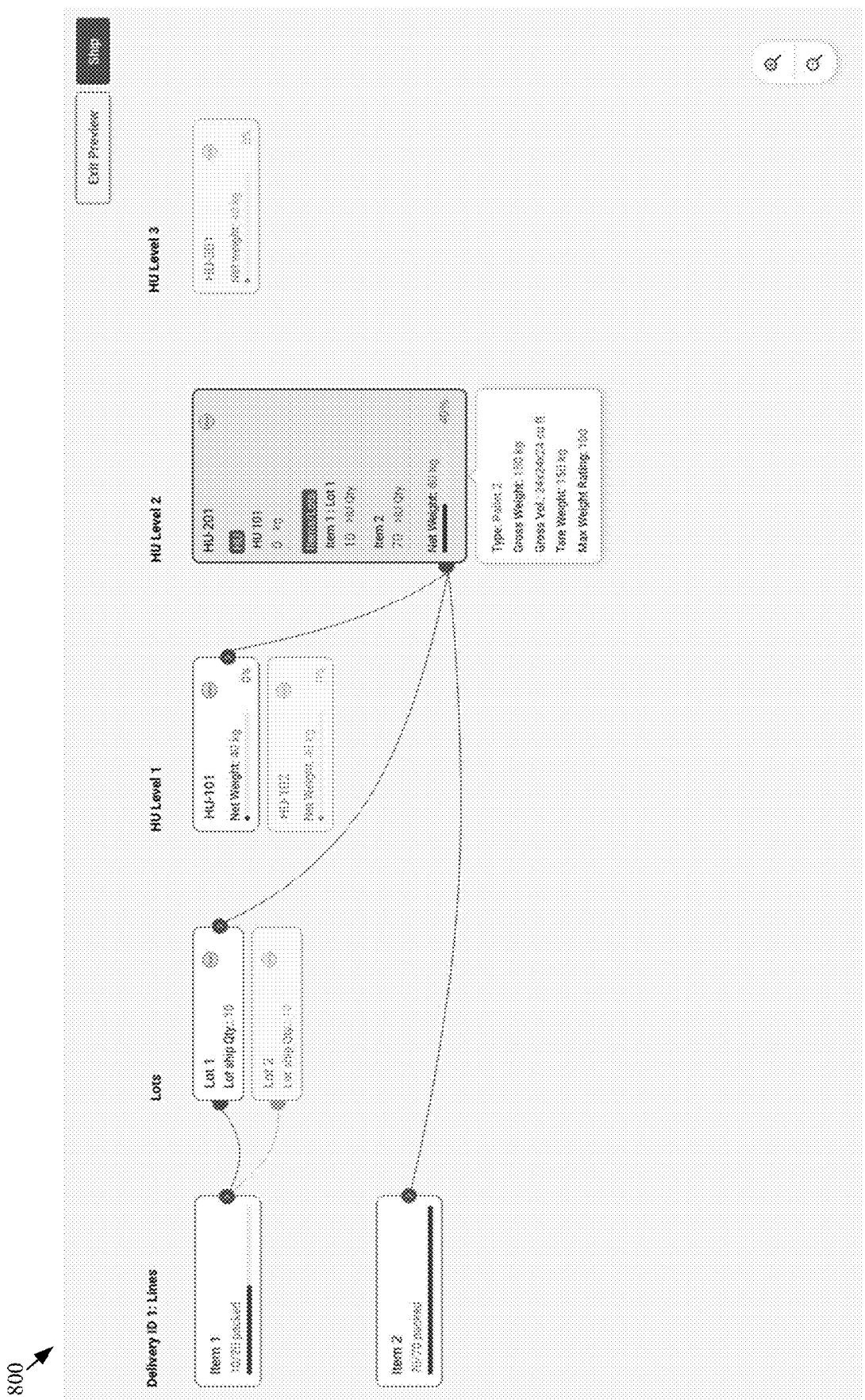
FIG. 8 is a graphical user interface (GUI) showing graphical elements related to high level view of pick-pack-ship system with preview of one or more graphical elements in accordance with an example embodiment of the invention.

FIG. 8 is a graphical user interface (GUI) 800 showing graphical elements related to high level view of pick-pack-ship system with preview of one or more graphical elements in accordance with an example embodiment of the invention.

Figure 9:
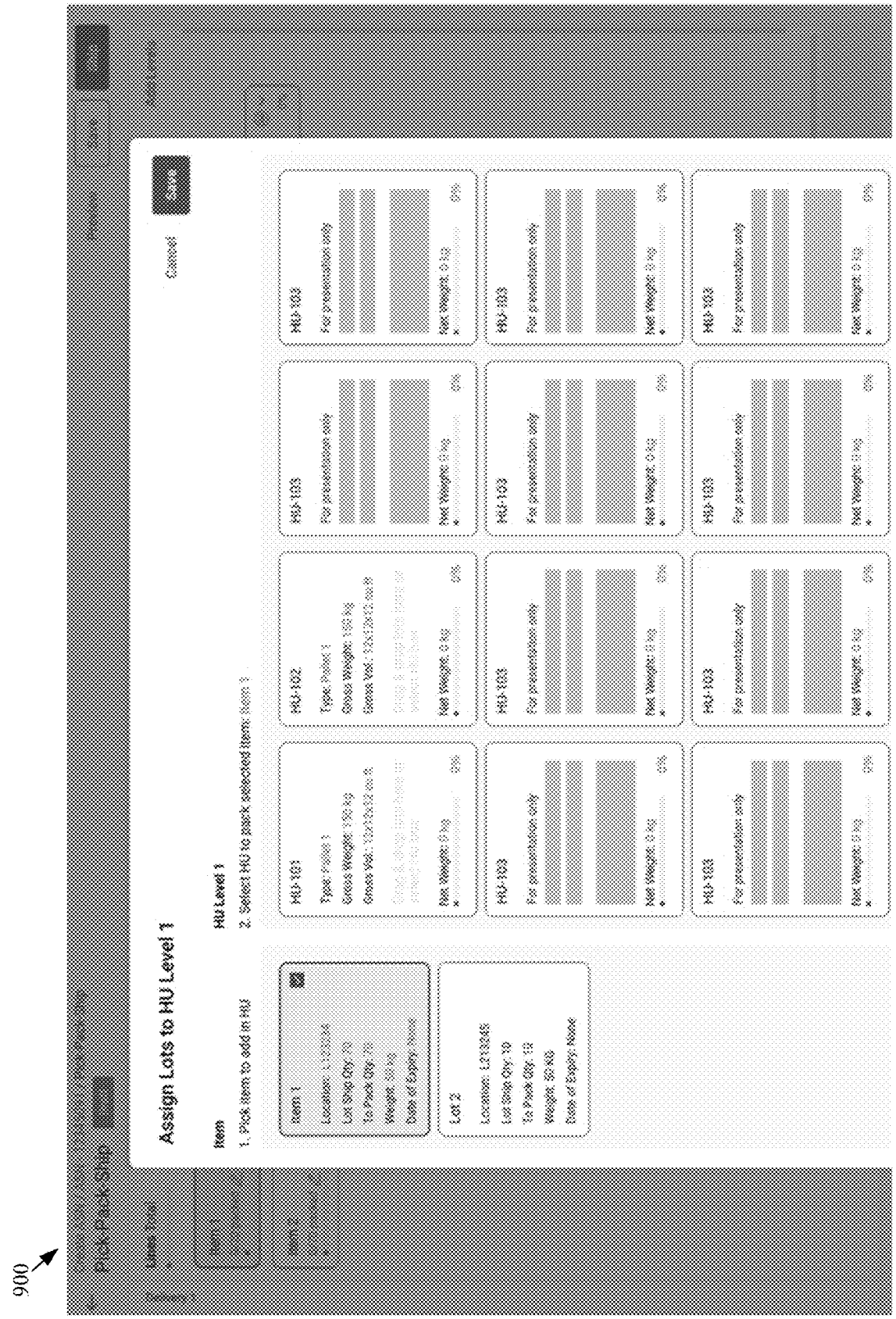
FIG. 9 is a graphical user interface (GUI) showing graphical elements related to one or more HU available for selection to package one or more item in accordance with an example embodiment of the invention.

FIG. 9 is a graphical user interface (GUI) 900 showing graphical elements related to one or more HU available for selection to package one or more item in accordance with an example embodiment of the invention. The HU is determined based on the item to be packaged, the route of shipment, the delivery time, etc. The handling unit may be a box of cardboard or other packaging materials.

Figure 9A:
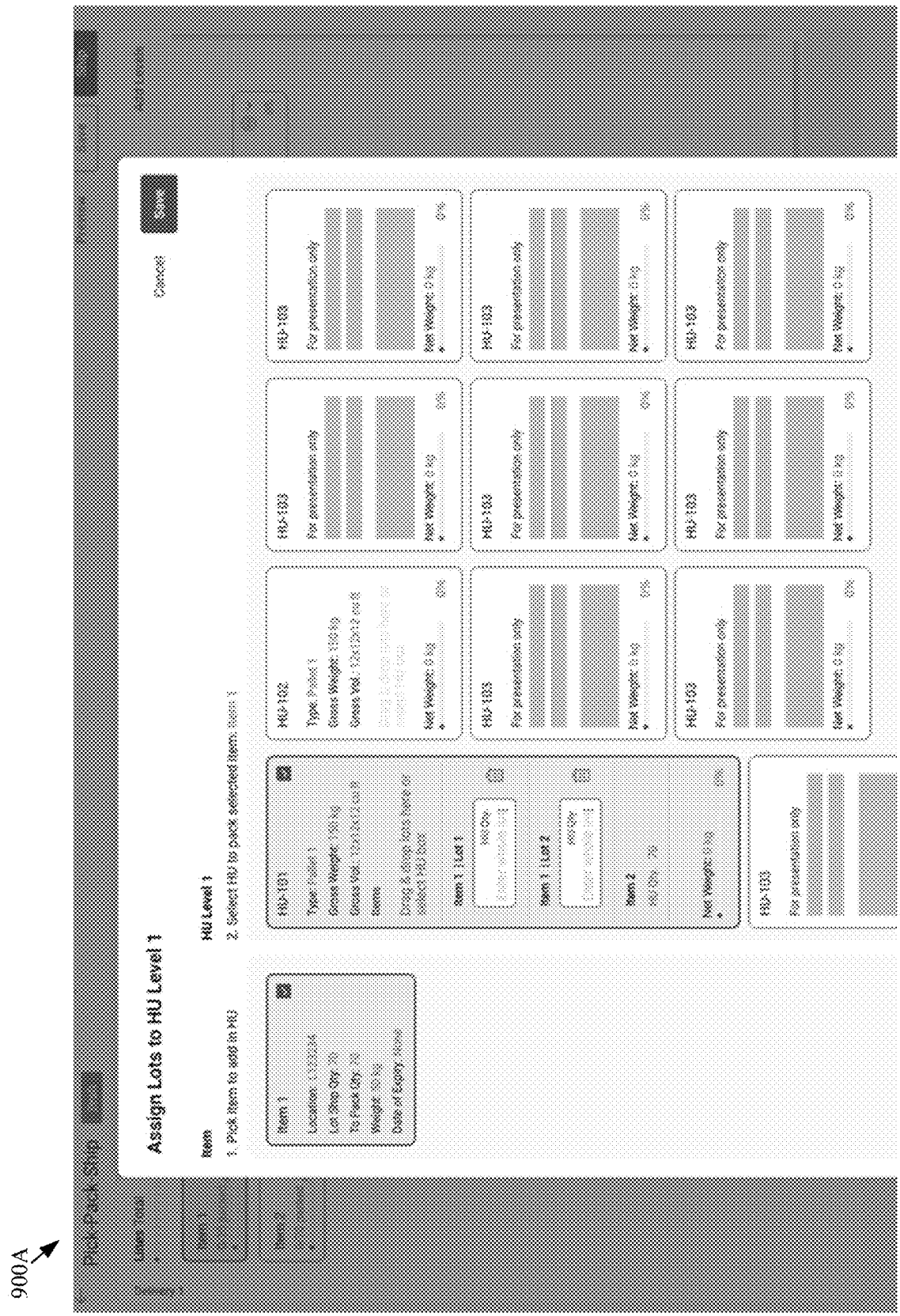
FIG. 9A is a graphical user interface (GUI) showing graphical elements related to one or more HU with properties like quantity available for packaging one or more lots in accordance with an example embodiment of the invention.

FIG. 9A is a graphical user interface (GUI) 900A showing graphical elements related to one or more HU with properties like quantity available for packaging one or more lots in accordance with an example embodiment of the invention. The properties of the HU are editable depending on the type of item or number of lots to be packages in the HU.

Figure 9B:
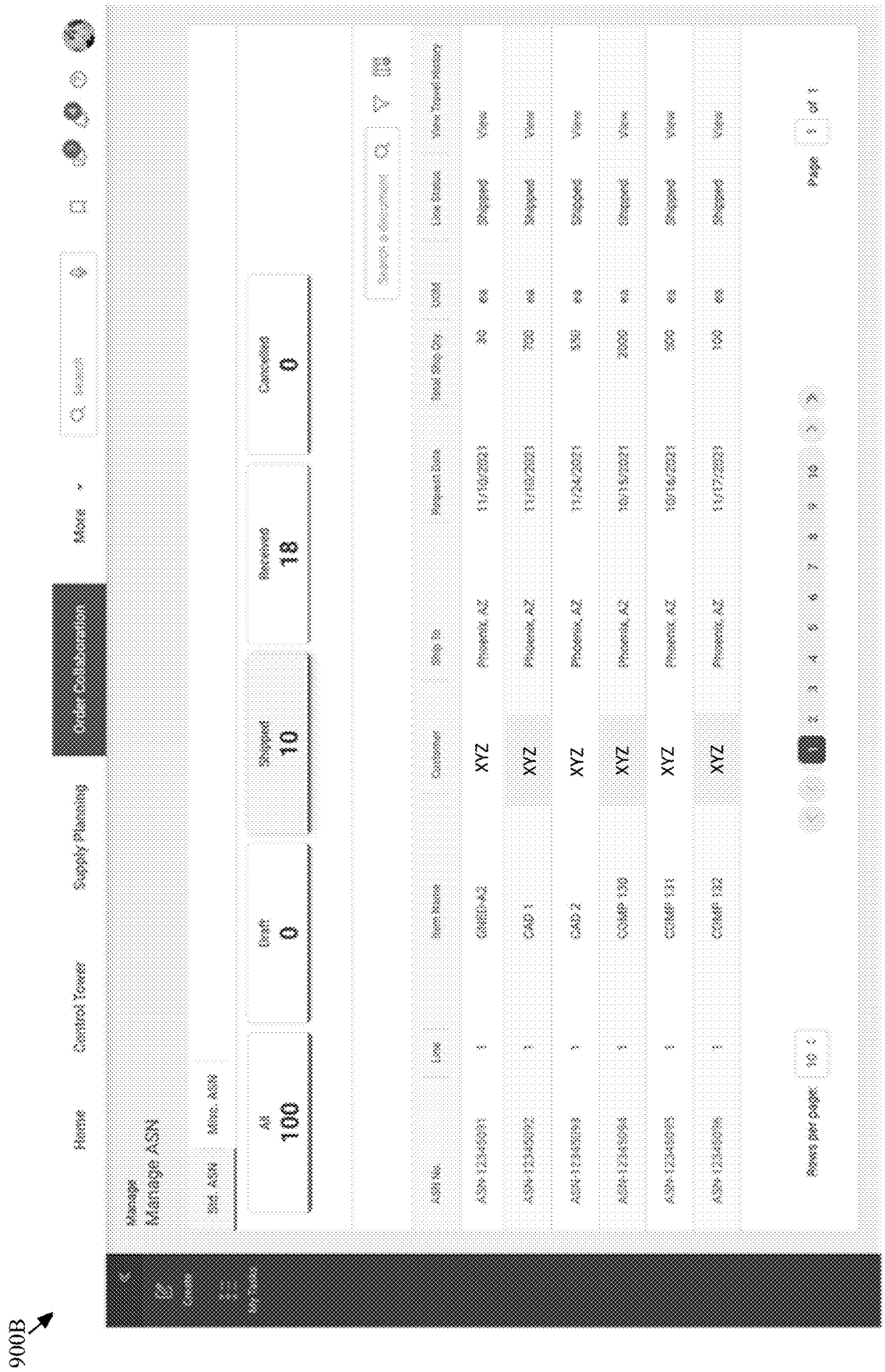
FIG. 9B is a graphical user interface (GUI) showing graphical elements related to one or more shipment data of the one or more HU in accordance with an example embodiment of the invention.

FIG. 9B is a graphical user interface (GUI) 900B showing graphical elements related to one or more shipment data of the one or more HU in accordance with an example embodiment of the invention. The shipment data related to type of shipment, delivery time, tracker data related to a vehicle shipping the item, etc., are generated as data points on the GUI.

Figure 10:
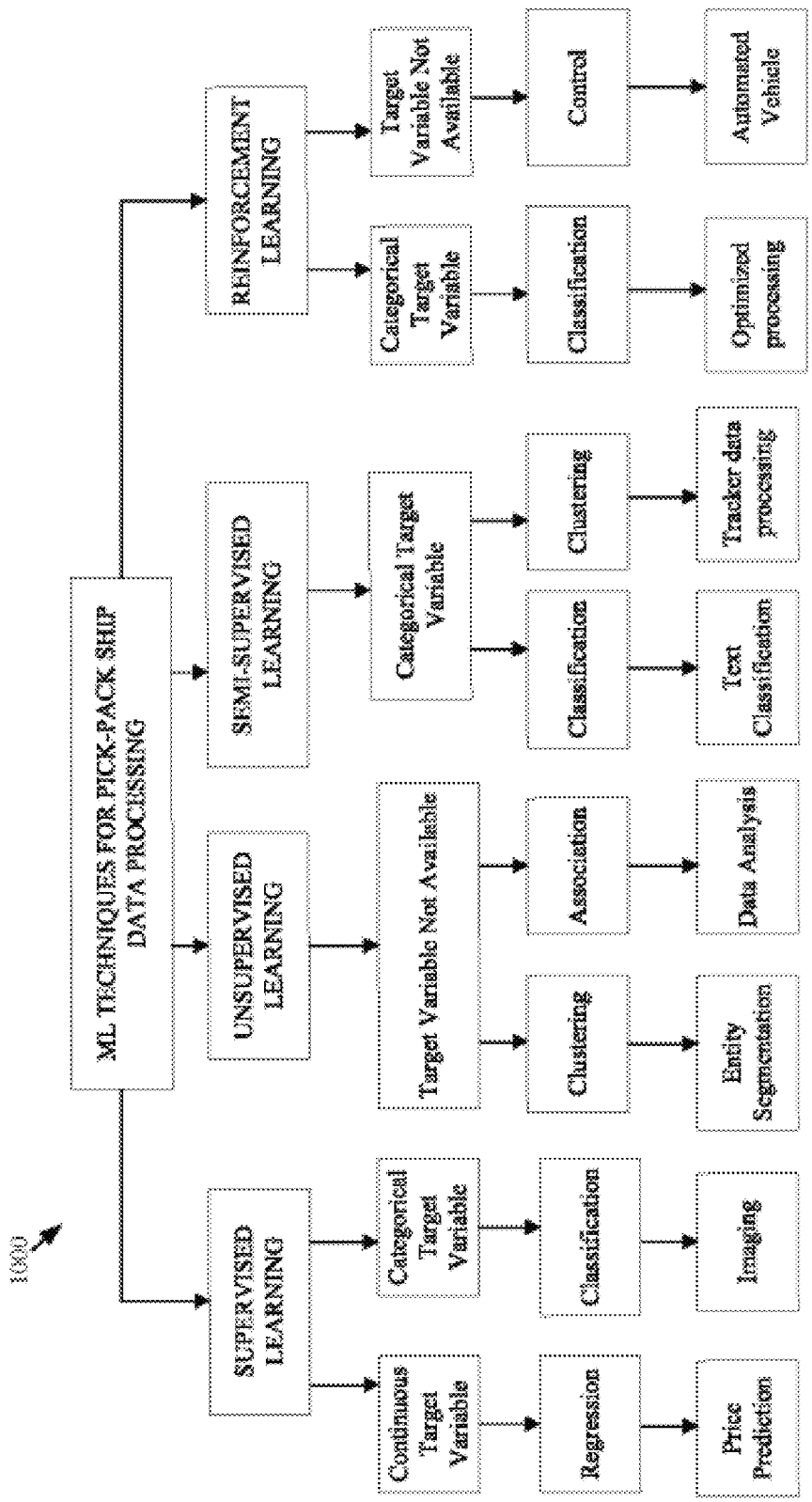
FIG. 10 is a block diagram showing one or more machine learning techniques for pick-pack-ship data processing in accordance with an example embodiment of the invention.

In an example embodiment, the data processing system and method of the present invention utilizes one or more machine learning techniques as depicted in the block diagram 1000 of FIG. 10. The invention may utilize supervised, unsupervised, semi-supervised or reinforcement learning depending on the data attributes associated with the data in the supply chain enterprise application for pick-pack and shipping process. While FIG. 10 provides one or more machine learning techniques deployed for pick-pack-ship data processing system of the present invention, it shall be apparent to a person skilled in the art that these techniques depend on the nature of data to which the ML is applied and the data models to be created for specific scenarios in supply chain. There are other ML techniques that may be used for processing the data and projecting data points on the GUI providing actionable insights to a user.

In an exemplary embodiment, a convolution neural network is used for classification that focuses on presence of keywords rather than sequence for feature extraction as the description for a pick-pack-ship scenario of an enterprise application may include short text containing a series of keywords without grammatical structure. One-dimensional convolutions are performed on the sequence of word embedding vectors provided as inputs.

Figure 10A:
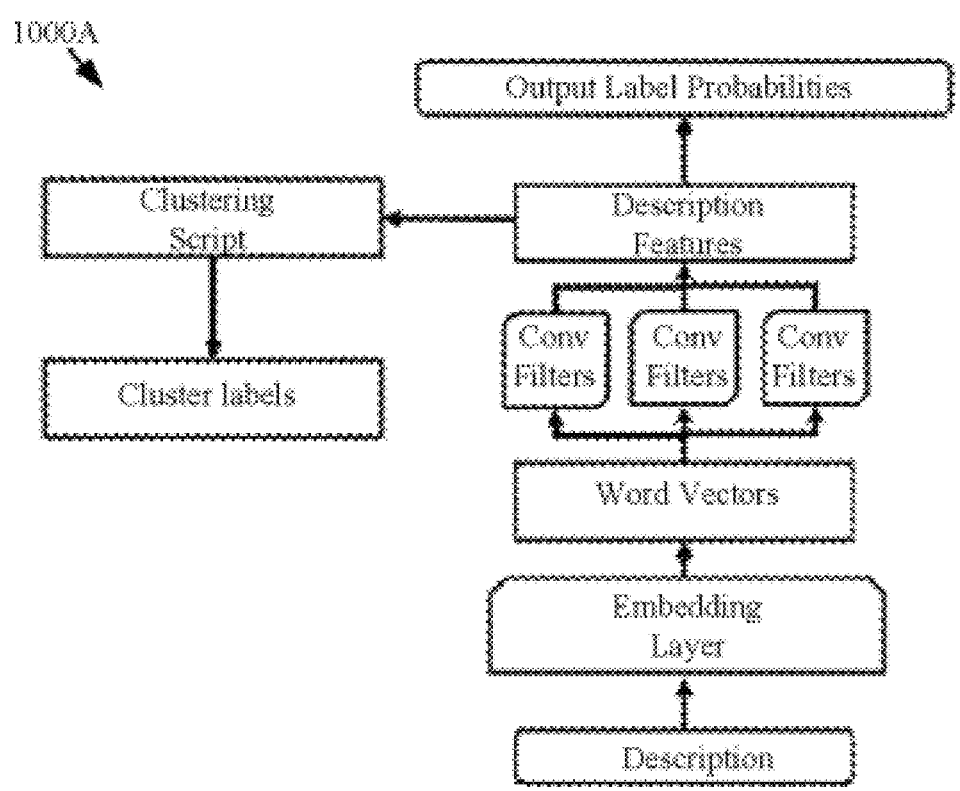
FIG. 10A is a block diagram showing different components of a data classifier in accordance with an embodiment of the invention.

Three different window widths with plurality of filters (eg: 128 filters) for each window width are used. This ensures filters learn for different n-grams in a training dataset. The model output is a Softmax layer with a size equal to the number of categories present. The block diagram providing different components of the data classifier 1000A are shown in FIG. 10A. The categorical cross entropy (CE) loss function may be used for computing the gradients for training the network.

While the data classifier 1000A is shown in FIG. 10A as an example embodiment, it shall be apparent to a person skilled in the art, that data classification can be done with different techniques for the historical dataset related to pick-pack ship application in supply chain.

Figure 10B:
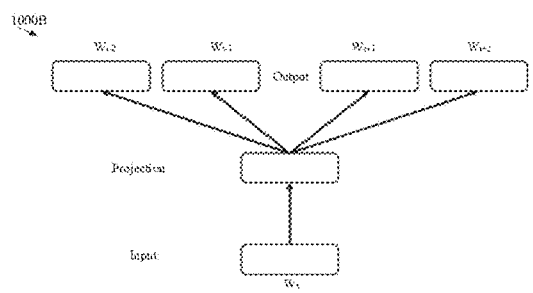
FIG. 10B is a skip-gram model of word embedding in accordance with an embodiment of the invention.

Referring to FIG. 10B, provides a skip-gram model 1000B of word embeddings in accordance with an example embodiment of the invention. The semantic relationship of words is encoded in the embedding space in the form of similar vectors. The word embeddings are trained using the skip gram model where the current word embedding is used to predict the word embedding of the surrounding context. The extraction of Words is followed by several downstream tasks that rely on the use of Natural Language Processing (NLP) with deep learning algorithms. A word or token is mapped to a feature space that captures its semantic and syntactic meaning. This is achieved by training word embeddings where each word is mapped to a vector of dimension D. This D-dimensional embedding space captures the relationship between different words in the vocabulary. The word embeddings are trained using the fast text framework that relies on the skip-gram model 1000B. The word embedding of a token is mapped through a transformation to predict the word embedding vectors of its surrounding tokens. This is crucial to capture the subtle differences between words having either the same suffix or prefix. The vocabulary and training corpus for word embeddings is obtained by using the text present in the historical database. This is to ensure that the word embedding space is specific to object text i.e. it captures the grammatical structure and semantic meaning of words, sentences present in characteristic description of the object.

Figure 10C:
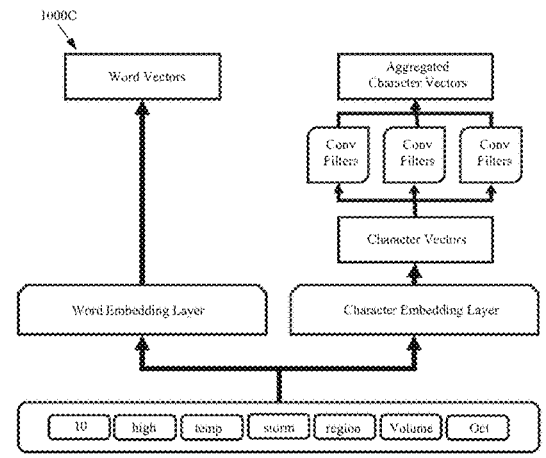
FIG. 10C is a block diagram showing concatenating words embedding with character embeddings in accordance with an embodiment of the invention.

Typical item data, lot data, handling unit data and other related pick-pack-ship application data includes descriptions with several numeric attributes and industry specific keywords. These are encoded as out-of-vocabulary (OOV) w.r.t the word embeddings. However, such attributes could contain useful information for classification. Character embeddings are used to represent such OOV words where each character in the word is represented by a $D_c$ dimensional vector and the vectors of all characters in a word are aggregated using a character level convolutional neural network (CNN). A block diagram 1000C of concatenating word embeddings with character embeddings is shown in FIG. 10C. This aggregated character embedding is concatenated with the word embedding to represent in each word in the text description.

In an exemplary embodiment, the unsupervised clustering of historical dataset is performed using the CNN models described earlier. The present invention trains the data classifier with the normalized taxonomy used as the output in a supervised learning setting. This data classifier is also used as a feature encoder as the feature space learned by this classifier at the prefinal layer captures a separable space across items. To perform item discovery, all the data is encoded through its corresponding classifier. The resultant feature vectors capture the semantic meaning of the line-item description.

In another exemplary embodiment, the present invention provides a nonparametric clustering method i.e. database scan (DB Scan) to be used on the feature vectors. Nonparametric clustering approach is used as the number of items that could be present can be unknown beforehand and it can also be a large number. The DB Scan is applied in a hierarchical fashion where the hypermeters for the algorithm are recursively tuned until all the clusters detected in the data are less than hundred line-items. The clustering approach is applied to the data with the most granular representation of categorization available through the data taxonomy.

One potential application is inventory management. For an entity that would like to transport a certain item, the item can be queried across all the detected clusters and the list of Handling units with the best match cluster to pack the item could be retrieved. Further, these clusters could be represented in the form of a graph database where multiple criterion such as capacity of Handling Unit, location of handling unit etc., can also be used as additional filters to recommend the best possible handling unit (HU).

In a related embodiment, the invention includes a graph database configured to store graph structures for semantic queries with nodes, edges and properties to represent and store data.

In an embodiment, the data processing system of the invention enables item to category mapping. The category mapping is performed through a bot by processing a clustering script to map item to a category. Even in case of a new item not previously processed, the script is configured to identify characteristics associated with the item and map it to the category or create a new category by processing through the AI engine.

In an exemplary embodiment, the present invention collates and scrubs data from one or more internal and external databases including ERPs, Vendor Management Systems, Newsfeeds from top Industry Sources, historical data, and inventory management systems for data analysis for prediction.

In an exemplary embodiment, the application user interface may enable cognitive computing to improve interaction between a user and the supply chain application(s). The intelligent interface provides insight into dynamically changing parameters such as key information obtained from live newsfeeds. The AI engine processes the newsfeed to draw relevance from the content and provide actionable insight to a user. Alternately, the system is configured to assign weights to type of news feeds and impact of certain news on demand of objects to auto rate the scenario and provide recommended forecast parameter. Further, in an advantageous aspect, the cognitive aspect of the invention enables a user to override an auto assessment by the AI engine if required.

In an example embodiment, the graphical elements of the GUI may me generated through a codeless development platform for the EA. The graphical elements including data points on the GUI may be restructured, re-modelled to generate a new element on the screen based on the requirement of the user interacting with the interface. The codeless platform used for development on the GUI enables microservices implementation on the interface thereby enabling easy customization of flows on the GUI. The customization layer of the codeless platform provides the microservices enabling end users to write codes to customize the operational flows as well as the end user application UI to execute the operations of SCM. The end user can orchestrate the data points exposed by the application UI to build custom functionality, to enable nuanced and complex workflows that are specific to the end user operational requirement or a third-party implementation user.

In an exemplary embodiment, the present invention may be a system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

The invention claimed is:

1. A data processing system for operating an enterprise application, the system comprising:
   at least one processor; and
   a memory storing instructions that allow the at least one processor to:
   receive at least one input data through one or more input data elements of one or more graphical elements on a graphical user interface (GUI) for executing at least one task wherein the one or more input data elements are associated with one or more data points of the GUI;
   in response to receiving the at least one input data, identify a relationship between the input data and the one or more data points based on one or more data attributes associated with the input data and the one or more data points;
   generate the one or more data attributes of the one or more data points on the interface based on the identified relationship, wherein the one or more graphical elements of the GUI enable a user to modify the data attributes depending on the task to be executed;
   process, by the at least one processor coupled to an Artificial intelligence (AI) engine, the at least one input data and the one or more modified data attributes of the one or more data points based on at least one data model;

process by the at least one processor, a historical dataset to generate and train the at least one data model by:

cleansing the historical dataset to obtain a normalized dataset, filtering the normalized dataset;

dividing the normalized dataset into training and testing dataset to generate the at least one data model;

extracting a plurality of categories from the normalized dataset for creating taxonomy;

extracting a plurality of distinct words from the normalized dataset to create a list of variables;

transforming the normalized dataset into a training data matrix using the list of variables, and creating the at least one trained data model from classification code vectors and the training data matrix by using a machine learning engine (MLE) and the AI engine;

and project, by the at least one processor, one or more stages in execution of the task on the GUI using the processed at least one input data and the processed one or more modified data attributes.

2. The system of claim 1 wherein a first data point of the one or more data points is connected to a second data point of the one or more data points on the interface by one or more connector elements of the one or more graphical element.

3. The system of claim 1, wherein the enterprise application includes a supply chain application configured to execute the at least one task of picking, packaging and shipping through the interface.

4. The system of claim 3, wherein the one or more data points include one or more item data, one or more lot data for each of the one or more item data, one or more HU data for each of the one or more lot data, and one or more shipping data for each of the one or more HU data.

5. The system of claim 4, wherein the relationship between the at least one input data and the one or more data points is identified by processing of a historical dataset by a processor coupled to an AI engine wherein the at least one input data is processed based on at least one data model trained on the historical dataset to identify the relationship and generate the one or more data attributes as the one or more data points on the GUI.

6. The system of claim 1, wherein the one or graphical element further comprises one or more data containers or data cards depicting the one or more data points on the GUI wherein the data cards are configured to remain in expanded state and collapsed state depending on the stage of the execution thereby providing the projection of the task on a single screen of the interface.

7. The system of claim 6, wherein the one or more graphical element includes one or more progress indicators related to the one or more data points and informing a user about state of progress made in one or more sub-tasks to be executed.

8. The system of claim 1, wherein the at least one data model is generated by the processor based on data enrichment of the historical dataset, wherein the method of data enrichment includes the steps of:

generating a prediction dataset for the testing dataset using the training data set through the at least one data model;

providing the prediction dataset as input to a neural network and testing data as output to identify one or more data attribute weights for determining accuracy of the prediction dataset; and in response to determination of accuracy to be above a threshold value, storing the dataset in the historical database.

9. The system of claim 1, wherein the one or more lot data as the one or more data points is predicted by:

cleansing the received at least one data object;

filtering the cleansed data object;

classifying the filtered data object to a set of existing clusters by a supervised machine learning based data classifier wherein the data classifier is applied to one or more cluster centers obtained from an unsupervised machine learning algorithm; and predicting the one or more lot data to be depicted on the GUI based on the classified data object.

10. A data processing method for operating one or more enterprise application, the method comprising the steps of:

receiving by at least one processor, at least one input data through one or more input data elements of one or more graphical elements on a graphical user interface (GUI) for executing at least one task wherein the one or more input data elements are associated with one or more data points of the GUI;

in response to receiving the at least one input data, identifying by the at least one processor, a relationship between the input data and the one or more data points based on one or more data attributes associated with the input data and the one or more data points;

generating by the at least one processor, the one or more data attributes of the one or more data points on the interface based on the identified relationship, wherein the one or more graphical elements of the GUI enable a user to modify the data attributes depending on the task to be executed; and processing, by the at least one processor coupled to an Artificial intelligence (AI) engine, the at least one input data and the one or more modified data attributes of the one or more data points based on at least one data model;

processing, by the at least one processor, a historical dataset to generate and train the at least one data model by:

cleansing the historical dataset to obtain a normalized dataset, filtering the normalized dataset;

dividing the normalized dataset into training and testing dataset to generate the at least one data model;

extracting a plurality of categories from the normalized dataset for creating taxonomy;

extracting a plurality of distinct words from the normalized dataset to create a list of variables;

transforming the normalized dataset into a training data matrix using the list of variables, and creating the at least one trained data model from classification code vectors and the training data matrix by using a machine learning engine (MLE) and the AI engine; and projecting by the at least one processor, one or more stages in execution of the task on the GUI using the processed at least one input data and the processed one or more modified data attributes.

11. The method of claim 10, wherein a first data point of the one or more data points is connected to a second data point of the one or more data points on the interface by one or more connector elements of the one or more graphical element.

12. The method of claim 10, wherein the enterprise application includes a supply chain application configured to execute the at least one task of picking, packaging and shipping through the interface.

13. The method of claim 12, wherein the one or more data points include one or more item data, one or more lot data for each of the one or more item data, one or more HU data for each of the one or more lot data, and one or more shipping data for each of the one or more HU data.

14. The method of claim 13, wherein the relationship between the at least one input data and the one or more data points is identified by processing of a historical dataset by a processor coupled to an AI engine wherein the at least one input data is processed based on at least one data model trained on the historical dataset to identify the relationship and generate the one or more data attributes as the one or more data points on the GUI.

15. The method of claim 10, wherein the one or graphical element further comprises one or more data containers or data cards depicting the one or more data points on the GUI wherein the data cards are configured to remain in expanded state and collapsed state depending on the stage of the execution thereby providing the projection of the task on a single screen of the interface.

16. The method of claim 15, wherein the one or more graphical element includes one or more progress indicators related to the one or more data points and informing a user about state of progress made in one or more sub-tasks to be executed.

17. The method of claim 10, wherein the at least one data model is generated by the processor based on data enrichment of the historical dataset, wherein the method of data enrichment includes the steps of:
generating a prediction dataset for the testing dataset using the training data set through the at least one data model;
providing the prediction dataset as input to a neural network and testing data as output to identify one or more data attribute weights for determining accuracy of the prediction dataset; and
in response to determination of accuracy to be above a threshold value, storing the dataset in the historical database.

18. The method of claim 10, wherein the one or more lot data as the one or more data points is predicted by:
cleansing the received at least one data object;
filtering the cleansed data object;
classifying the filtered data object to a set of existing clusters by a supervised machine learning based data classifier wherein the data classifier is applied to one or more cluster centers obtained from an unsupervised machine learning algorithm; and
predicting the one or more lot data to be depicted on the GUI based on the classified data object.

19. A non-transitory computer-readable medium comprising program code that is executable by at least one processor for causing the at least one processor to:
receive at least one input data through one or more input data elements of one or more graphical elements on a graphical user interface (GUI) for executing at least one task wherein the one or more input data elements are associated with one or more data points of the GUI;
in response to receiving the at least one input data, identify a relationship between the input data and the one or more data points based on one or more data attributes associated with the input data and the one or more data points;
generate the one or more data attributes of the one or more data points on the interface based on the identified relationship, wherein the one or more graphical elements of the GUI enable a user to modify the data attributes depending on the task to be executed;
process, by the at least one processor coupled to an Artificial intelligence (AI) engine, the at least one input data and the one or more modified data attributes of the one or more data points based on at least one data model;
process by the at least one processor, a historical dataset to generate and train the at least one data model by:
cleansing the historical dataset to obtain a normalized dataset,
filtering the normalized dataset;
dividing the normalized dataset into training and testing dataset to generate the at least one data model;
extracting a plurality of categories from the normalized dataset for creating taxonomy;
extracting a plurality of distinct words from the normalized dataset to create a list of variables;
transforming the normalized dataset into a training data matrix using the list of variables, and
creating the at least one trained data model from classification code vectors and the training data matrix by using a machine learning engine (MLE) and the AI engine; and
project one or more stages in execution of the task on the GUI using the processed at least one input data and the processed one or more modified data attributes.

20. The non-transitory computer-readable medium of claim 19, wherein the method is performed in a cloud or cloud-based computing environment.

* * * * *